United States Patent [19]

Matsuo et al.

[11] Patent Number: 5,010,997
[45] Date of Patent: Apr. 30, 1991

[54] TRANSPORT SYTSTEM

[75] Inventors: Yukito Matsuo; Tsuyoshi Ishida, both of Yokohama, Japan

[73] Assignee: Kabushiki Kaisha Toshiba, Kawasaki, Japan

[21] Appl. No.: 243,864

[22] Filed: Sep. 13, 1988

[30] Foreign Application Priority Data

Sep. 14, 1987 [JP] Japan .................... 62-230025

[51] Int. Cl.⁵ .............................................. B65G 47/46
[52] U.S. Cl. ............................. 198/349.7; 414/273
[58] Field of Search ............... 198/349, 349.5, 349.6, 198/349.7, 358; 414/273

[56] References Cited

U.S. PATENT DOCUMENTS

| 3,802,581 | 4/1974 | Frederick | 414/273 |
| 3,915,284 | 10/1975 | Knockeart et al. | 198/349.6 X |
| 4,219,296 | 8/1980 | Fujii et al. | 414/273 |
| 4,630,216 | 12/1986 | Tyler et al. | 198/349 |
| 4,693,373 | 9/1987 | Lamb et al. | 414/273 X |
| 4,719,694 | 1/1988 | Herberich et al. | 414/273 X |
| 4,786,229 | 11/1988 | Henderson | 414/273 X |
| 4,792,273 | 12/1988 | Specht | 414/273 X |
| 4,796,209 | 1/1989 | Burk | 414/273 X |
| 4,824,311 | 4/1989 | Mims | 414/273 |

FOREIGN PATENT DOCUMENTS 2137965 2/1973 Fed. Rep. of Germany ... 198/349.7

Primary Examiner—D. Glenn Dayoan
Attorney, Agent, or Firm—Finnegan, Henderson, Farabow, Garrett, and Dunner

[57] ABSTRACT

A transport system for use in a hospital. When patients visit the hospital, data items representing their ID numbers and the ID codes of their doctors are input to a minicomputer. In accordance with these data items, the covers containing the patients' medical cards are automatically withdrawn from three card storages installed in the hospital, in groups each consisting of cards which are to be transported to the same destination. The covers of each group are inserted into a case by way of the card-ejecting device provided for each card storage. The case containing the covers, which are to be transported to the same destination, is automatically transported to the destination via a case transfer apparatus.

19 Claims, 19 Drawing Sheets

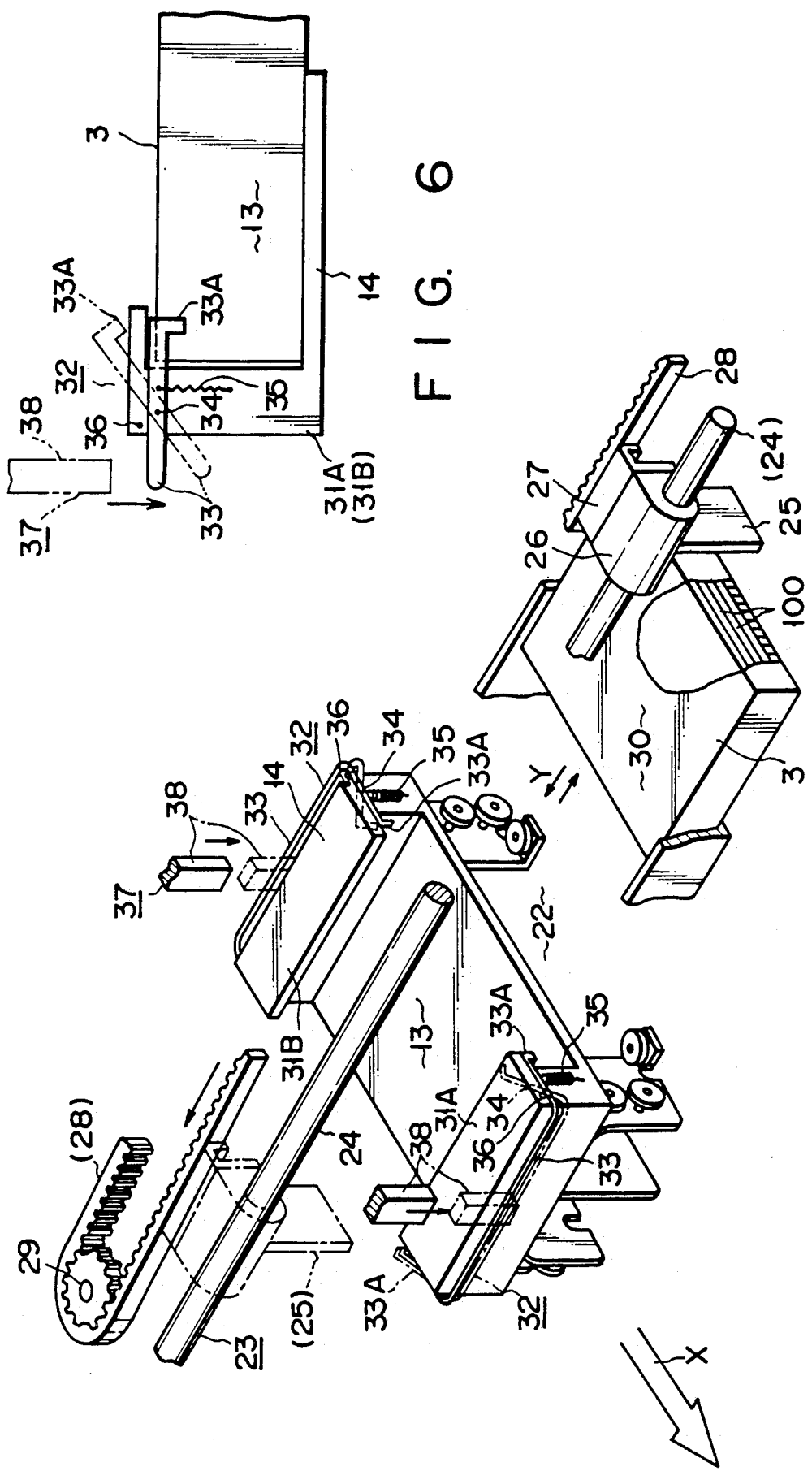

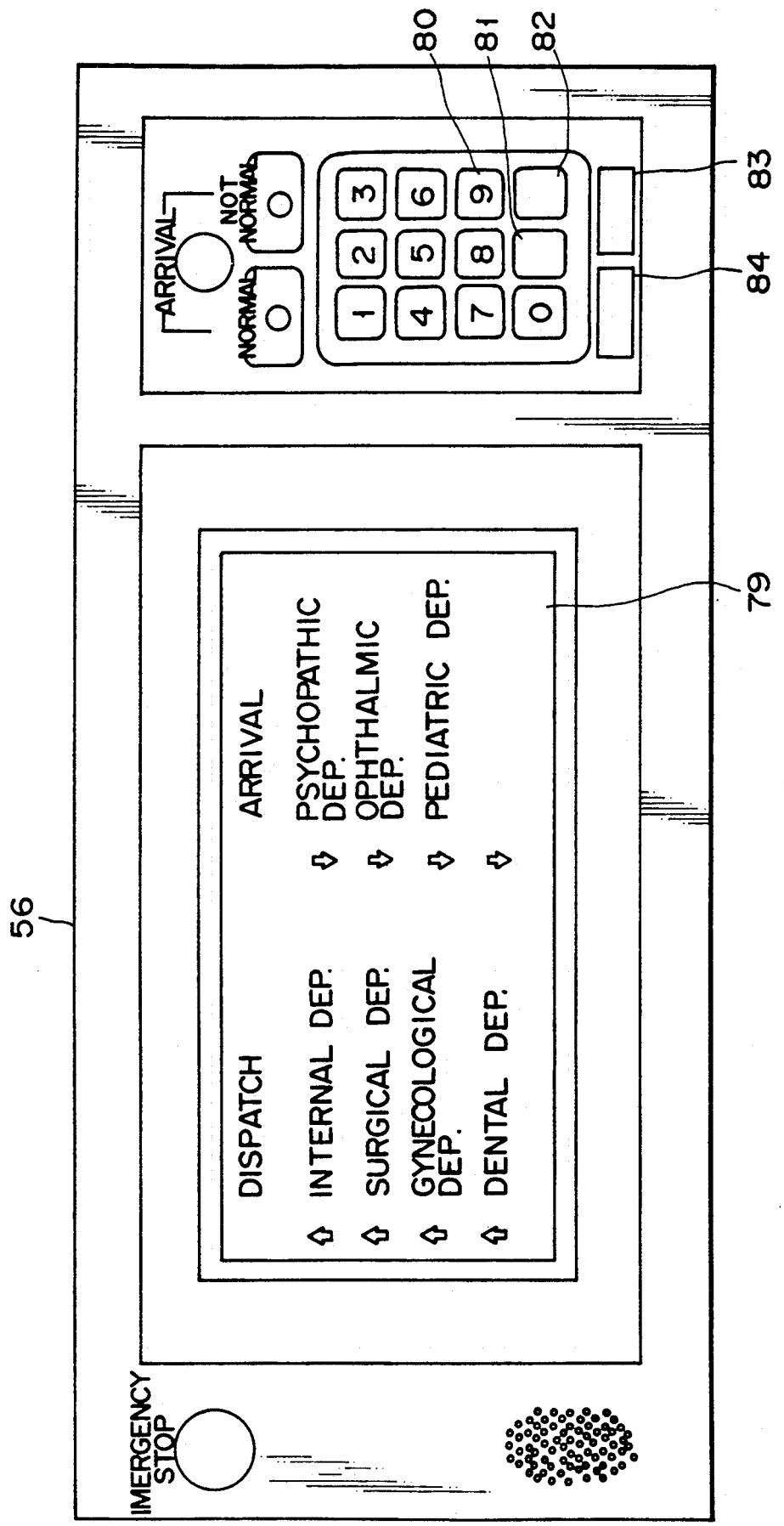

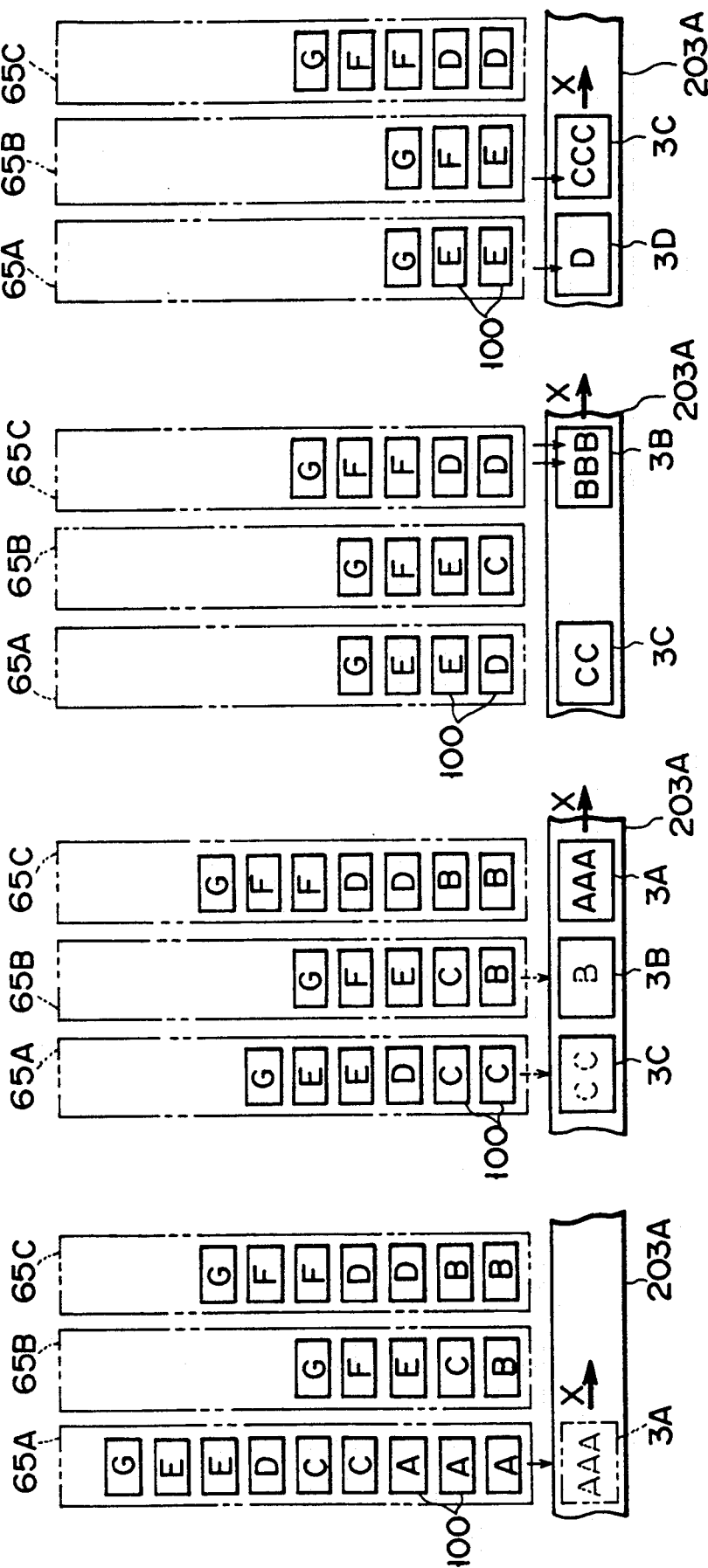

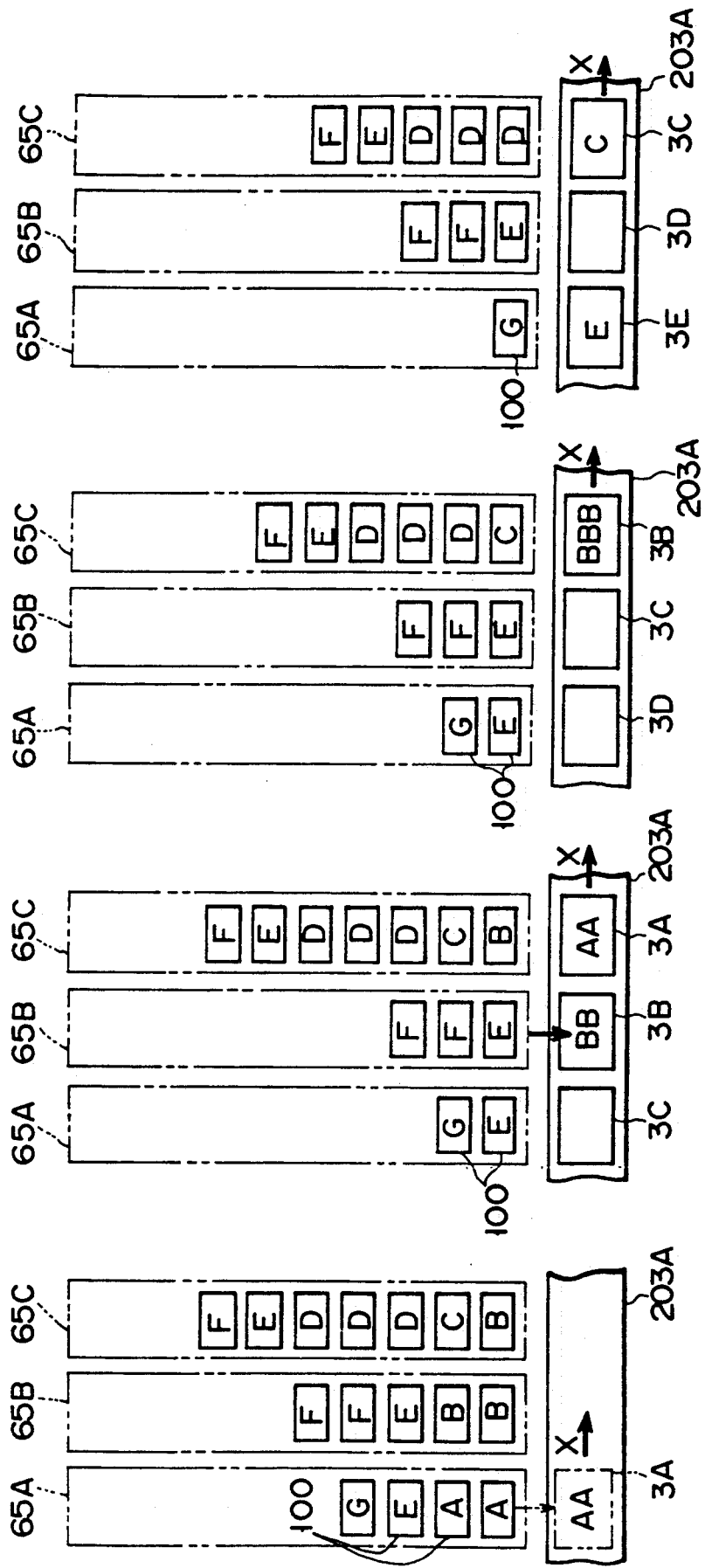

TRANSPORT SYTSTEM

BACKGROUND OF THE INVENTION

1. Field of the Invention

The present invention relates to a transport system and, more particularly, to a transport system for use in a large hospital for transporting articles, such as medical cards, in a desired manner between a card storage room, on the one hand, and doctor's offices, on the other.

2. Description of the Related Art

All information about a patient, such as the symptoms, the case history, and the like, is recorded in a medical card. The medical cards are very important, and are therefore treated in the same way as certificates. Medical cards are sheets of papers, on which doctors may write the information about their patients. In a large hospital having various departments, the medical cards are filed and stored in a storage room. When a patient visits the hospital to see the doctor, his or her card is sent from the storage room to the doctor's office. After the patient has received an examination or a treatment, or both, in the doctor's office, his or her card is carried back to the storage room by means of a lack wagon or the like.

Two methods are known for taking medical cards from the storage room. The first method is manual, and the second method is automatic. In the first method, the cards are manually taken from the lacks or drawers installed within the storage room. In the second method, they are automatically delivered from an automatic storage room (hereinafter referred to as "automatic card storage"). The automatic card storage is used in a large hospital which has many medical departments and where many patients stay and visit, in order to reduce the time for fetching desired medical cards for doctors. The medical cards supplied from the automatic card storage are manually classified in accordance with the medical departments concerned, and the cards thus classified are transported to the respective doctor's offices by persons or by means of linear-motor vehicles. Such vehicles are disclosed in West German Patent Publication No. DE-OS 37 16 353 (U.S. patent application Ser. No. 049,404). The use of the automatic card storage and the linear-motor vehicles reduces the time required for providing the doctors with the medical card they need.

As has been described, the medical cards automatically supplied from the automatic card storage must be manually classified so that they may be sent to the doctor's offices where they are needed. Obviously, the classification of the cards requires much labor and long time.

SUMMARY OF THE INVENTION

The object of the present invention is to provide a transport system for classifying articles, such as medical cards supplied from an automatic card storage, in accordance with their destinations and then transporting these articles to their destinations.

According to the present invention, the articles delivered from the automatic storage are first transported to the stations provided for the destinations of the articles, respectively, and then to the destinations. No labor is required to classify the articles in accordance with their destinations, or to carry the articles to their destinations. The transport system according to the invention can, therefore, save labor and time both required for transporting the articles to their respective destinations.

BRIEF DESCRIPTION OF THE DRAWINGS

FIG. 5 is a perspective view schematically showing one of those portions of the main transport path where the carrier can be stopped;

FIG. 6 is a front view schematically illustrating a means for fastening the case to the carrier;

FIG. 1 is a diagram explaining how the cases are transported within the second station;

FIG. 12 is a sectional view of the means for preventing the cases from jumping out of the second station;

FIG. 13 is a front view of the console panel of the second station;

FIGS. 20A to 20D are first diagrams, explaining how the medical cards are classified in the steps described with reference to the flow chart of FIGS. 19A to 19C; and FIGS. 21A to 21D are second diagrams, explaining how the medical cards are classified in the steps described with reference to the flow chart of FIGS. 19A to 19C.

DETAILED DESCRIPTION OF THE PREFERRED EMBODIMENT

One embodiment of the present invention will be described with reference to the accompanying drawings.

Figure 1:
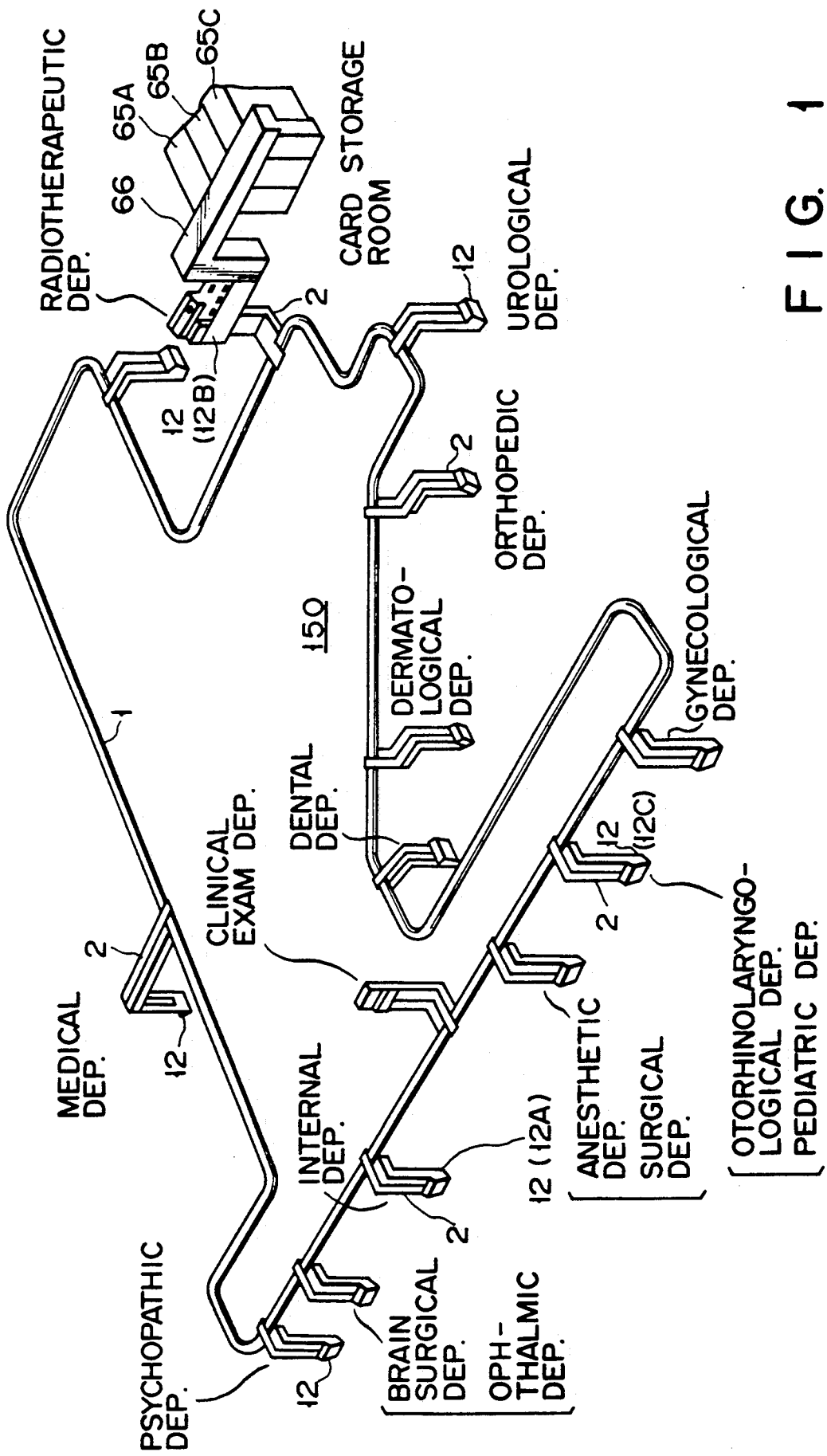
FIG. 1 is a diagram schematically illustrating a transport system according to the present invention.

FIG. 1 is a schematic representation of the transport system installed in a hospital consisting of many departments, i.e., a first embodiment of the present invention. The system comprises main transport path 1 and branch paths 2—all designed for transporting cases 3. Main transport path 1 is a loop path provided in the ceiling such that cases can be transported to the doctor's offices by means of branch paths 2. Branch paths 2 are connected to main transport path 1 and vertically extend therefrom on the walls of the doctor's offices in the internal department, pediatrics department, surgical department, dental department, etc., on the walls of the offices of the clerical department, and on the walls of the card storages (hereinafter called "card rooms").

Each branch path 2 is connected to station 12 (12A, 12B, . . .) set on the floor of an office. Cases 3 can be supplied to station 12 from branch path 2, or from station 12 to branch path 2. For example, case 3 containing articles 100, such as medical cards, slips, bottles of blood, bottles of Ringer's solution, or the like, can be transported back and forth between branch path 2 and station 12. Since branch paths 2 are connected to main transport path 1, cases 3 can transport back and forth in main transport path 1. Hence, articles 100 can be transported from one station to any other station and removed from case 3 at the other station. A predetermined number of cases 3 are being transported in main transport path 1 and branch path 2 at all times.

Figure 2:
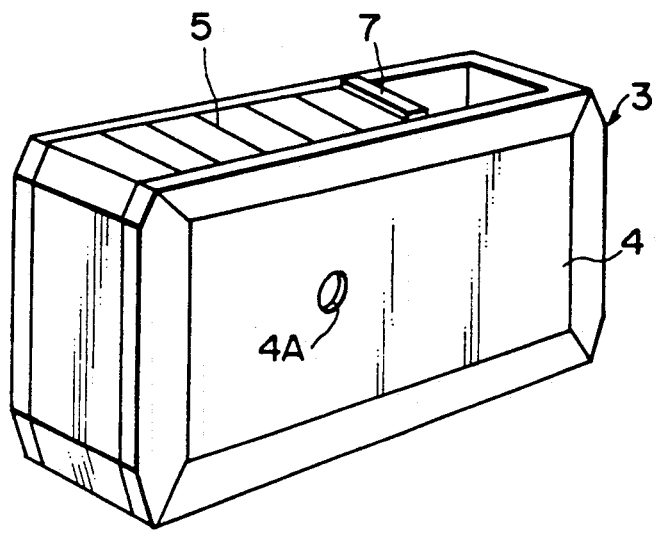
FIG. 2 is a perspective view of the case used in the transport system.

As is shown in FIG. 2, case 3 is a rectangular box. Case 3 comprises rectangular hollow body 4 and flexible cover 5. Body 4 has an opening through which articles 100 can be inserted into case or removed therefrom. The opening is closed by cover 5. Cover 5 is slidably mounted on a U-shaped guide rail (not shown) which extends along the rim of the opening. Projection 7 is formed integrally with one end portion of cover 5. Therefore, when projection 7 is held and is pushed, cover 5 will slide on the rail, thus opening or closing case 3.

Figure 3:
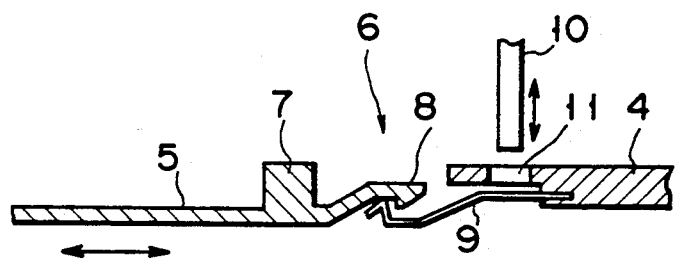
FIG. 3 is a cross-sectional view showing the lock mechanism for locking the cover of the case.

Case 3 is provided with lock mechanism 6 shown in FIG. 3. This mechanism 6 comprises hook 8 and elastic tongue 9. Hook 8 is formed integrally with the end portion of cover 5. Elastic tongue 9 is secured to body 4 at one end. When the other end of tongue 9 comes into engagement with hook 8, cover 5 is locked to body 4. Case 3 also has hole 11 in which movable member 10 can be inserted to release elastic tongue 9 from the engagement with hook 8, thereby releasing cover 5 from the locked condition. Body 4 has hole 4A through which it can be ascertained as to whether case 3 contains articles 100 or not.

Figure 4:
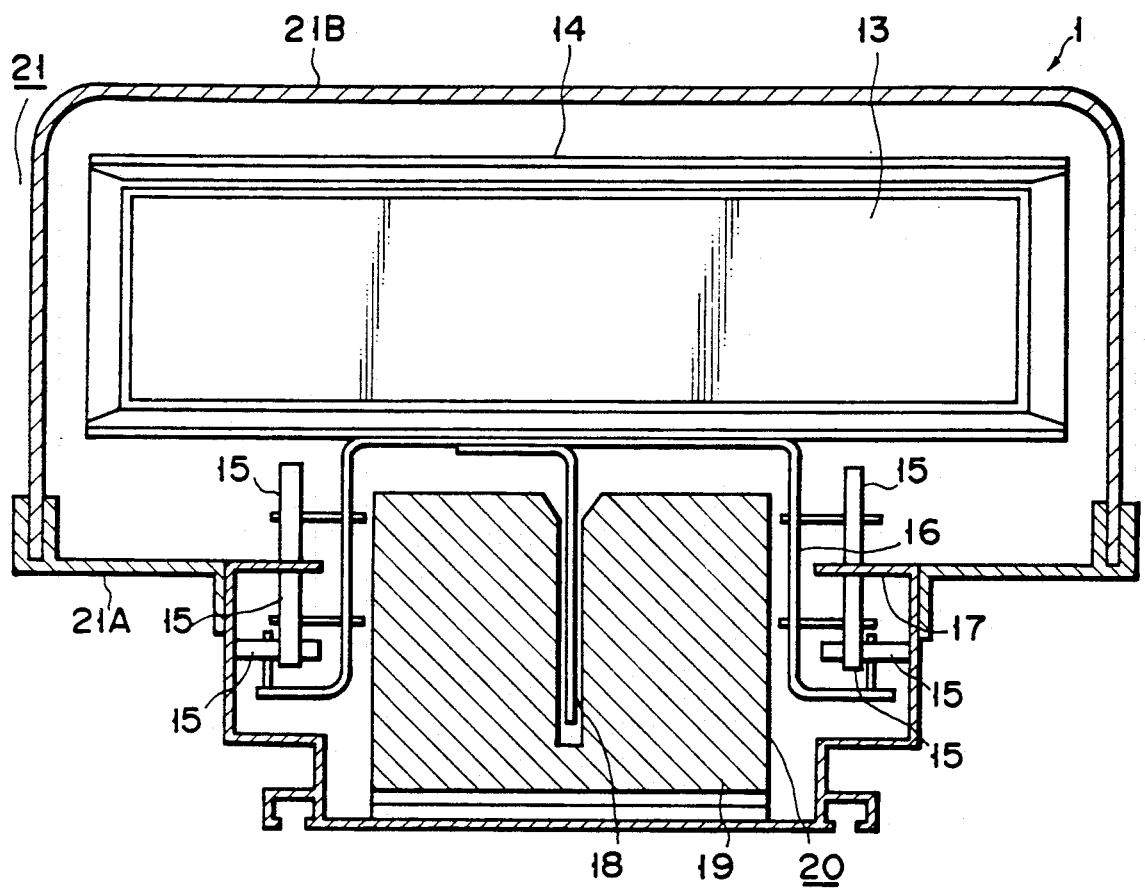
FIG. 4 is a partial sectional view showing the main transport path of the transport system, and also showing the carrier which is moved in the main transport path.

Case 3 having the structure described above is transported in main transport path 1 to desired stations 12 by means of carriers 14. As is shown in FIG. 4, carriers 14 are located within casing 21 which covers main transport path 1. Casing 21 comprises two halves, i.e., lower half 21A and upper half 21B. Upper half 21B can be detached from lower half 21A, so that main transport path 1 can easily be inspected and maintained. Each carrier 14 has storage section 13 for storing case 3, and support 16 for supporting storage section 13. Support 16 has four sets of wheels 15. Wheels 15 of the first and second sets are arranged such that they clamp one of two rails 17 provided within casing 21 and extending parallel to each other, along main transport path 1. Wheels 15 of the third and fourth sets are arranged such that they clamp the other rail 17. Supported in this manner, carrier 14 can move along guide rails 17, that is, in the direction perpendicular to the plane of the diagram (FIG. 4).

A number of thrust means 19 are arranged along main transport path 1. They 19 are located below support 16 for thrusting carriers 14 forward along main transport path 1. Each thrust means 19 is a stator or a primary conductor, and has a relatively deep groove extending from the top toward the bottom. Secondary conductor 18 is connected at one end to the bottom of each carrier 14, and extends downward into the groove of thrust means 19. The thrust generated by means 19 is transmitted to secondary conductor 18, whereby carrier 14 is driven along main transport path 1 at the speed of about 5 m/s. To stop carrier 14, thrust means 19 apply a braking force on secondary conductor 18. Hence, thrust means 19 (i.e., primary conductors) and secondary conductors 18 constitute linear motor 20.

Thrust means 19 are electrically connected to CPUs 95 and $96_1$ to $96_n$ for stopping carriers 14 and controlling the speed of carriers 14. In accordance with the instructions given by CPUs 95 and $96_1$ to $96_n$, thrust means 19 applies a thrust or braking force to carriers 14.

As has been described, thrust means 19 are arranged along main transport path 1. More specifically, stators 19 are divided into several groups, and these groups are provided in those portions 22 of path 1 which are connected to branch paths 2. Stators 19 of any group are controlled by the same CPU, to apply a thrust or a braking force to carriers 14 staying at, or passing by portion 22. Hence, carriers 14 can be moved from, or stopped at, said portion 22 of main transport path 1.

Figure 7:
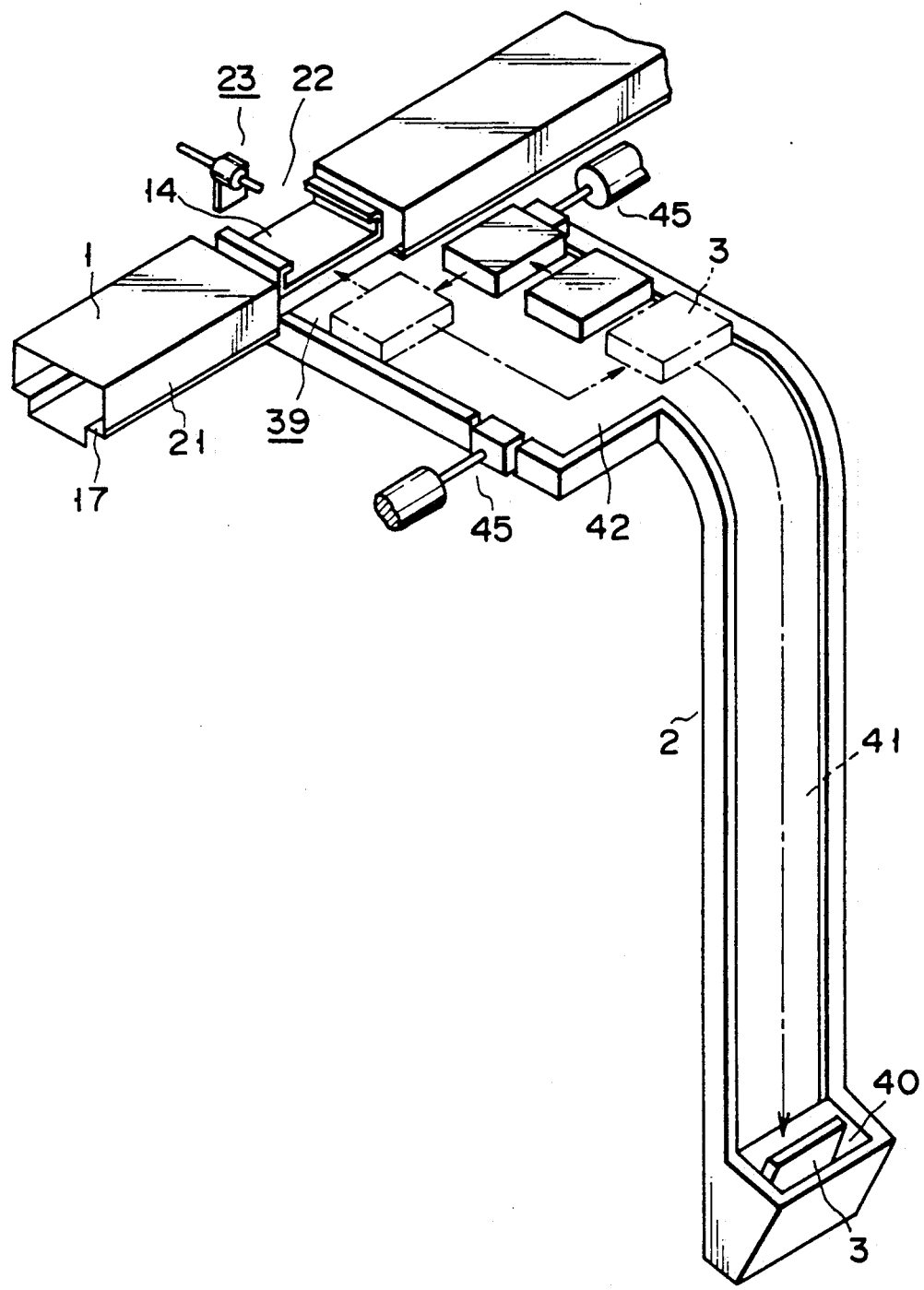
FIG. 7 is a perspective view of the main transport path and a branch path connected to the main transport path, explaining how the cases are transported from the main transport path to the branch path, and vice versa.

As is illustrated in FIGS. 5 and 7, driver 23 is provided at each portion 22 of path 1, where carriers 14 can be stopped. More precisely, driver 23 is located at the position where branch path 2 is connected to main transport path 1. Driver 23 is controlled by the same CPU that controls stators 19 provided at portion 22 of path 1, to move case 3 to branch path 2 from carrier 14 staying at portion 22 of path 1, or to carrier 14 from branch path 2. In other words, case 3 containing articles 100 or no articles can be automatically transported back and forth between main transport path 1 and branch path 2.

The structure of driver 23 will be described with reference to FIGS. 5 and 7. Guide shaft 24 extends at right angles to the lengthwise direction of main transport path 1, that is, in the direction of arrow X, as is shown in FIG. 5. Plate 25 is fixed to movable member 26, which in turn is mounted on guide shaft 24. Movable member 26 is coupled by coupling 27 to timing belt 28. Timing belt 28 is wrapped around two pulleys 29 (only one shown) located near the ends of guide shaft 24, respectively. One of these pulleys 29 is connected to a pulse motor by a reduction gear mechanism (not shown). Thus, as pulse motor is driven, plate 25, which is fastened to movable member connected to belt 28, is moved along guide shaft 24, or in the direction of arrow Y (FIG. 5).

Plate 25 is positioned at such a level as to push the side of case 3 located at portion 22 of main transport path 1. Thus, when plate 25 is moved forward along guide shaft 24, case 3 is pushed from carrier 14 to case transfer section 30 which connects branch path 2 to main transfer path 1. When plate 25 is moved backward along shaft 24, case 3 is pushed from case transfer section 30 onto carrier 14. Case 3 is mounted in storage section 13 of carrier 14, held between a pair of L-shaped holders 31A and 31B which are secured to carrier 14. Both holders 31A and 31B are designed, allowing case 3 to moved in either lengthwise direction of guide shaft 24. To prevent case 3 from coming out of storage section 13 of carrier 14, two fastening means 32 are connected to holders 31A and 31B, respectively, as is shown in FIG. 6.

Fastening means 32 are identical in structure. So, only one of them will be described, with reference to FIG. 6. As is shown in this figure, fastening means 32 comprise fastening member 33, two pins 34, spring 35, and stopper 36. Member 33 is made of a thin rod, bent in the form of letter U. Pins 34 protrude from the sides of holder 31A. Stopper 36 is a projection protruding from one side of holder 31A. Fastening member 33 is rotatably supported by pins 34A, and is biased by spring 35 and set in the horizontal position indicated by the solid lines, abutting on stopper 36. While in this horizontal position, both ends 33A of member 33 contacts case 3 mounted in storage section 13 of carrier 14, thereby fastening case 3 to carrier 14. The other fastening means 32 connected holder 31B functions exactly in the same manner, to fasten case 3 to carrier 14.

At each portion 22 of main transport path 1, releasing means 37 are provided to release case 3 from fastening means 32 whenever necessary. Releasing means 37 comprises a pair of rods 38 and a hydraulic drive unit (not shown) for moving both rods 38 vertically. When moved downward by the hydraulic drive unit, rods 38 push down the outer end of member 33 of fastening means 32 against the bias of springs 35, as is indicated by the one-dot, one-dash lines shown in FIG. 5. As a result, fastening member 33 rotate around pins 34, taking such position where they allow case 3 to be pulled from carrier 14 or inserted into carrier 14. The hydraulic drive unit of releasing means 37 is controlled by the same CPU that controls driver 23.

As is shown in FIG. 7, case transfer section 40 is connected to the distal end of each branch path 2. At this section 40, cases 3 sent from main transport path 1 can be received at this section 40. Cases 3 to be supplied to main transport path 1 can be inserted into this section 40.

Further, stage 42 is connected to the proximal end of each branch path 2. Stage 42 is large enough to support six cases 3 at the same time, in two rows each consisting of three cases. Thus, at most six cases 3 can temporarily stay on this stage 42. As is shown in FIG. 7, two pushing means 45 means provided at both sides of stage 42, respectively. Pushing means 45 cooperate to move any desired case 3 from carrier 14 into branch path 2 so that the case is supplied to case transfer section 40, and also to move any desired case 3 from branch path 2 into carrier 14 so that the case is supplied to main transfer path 1.

Figure 8:
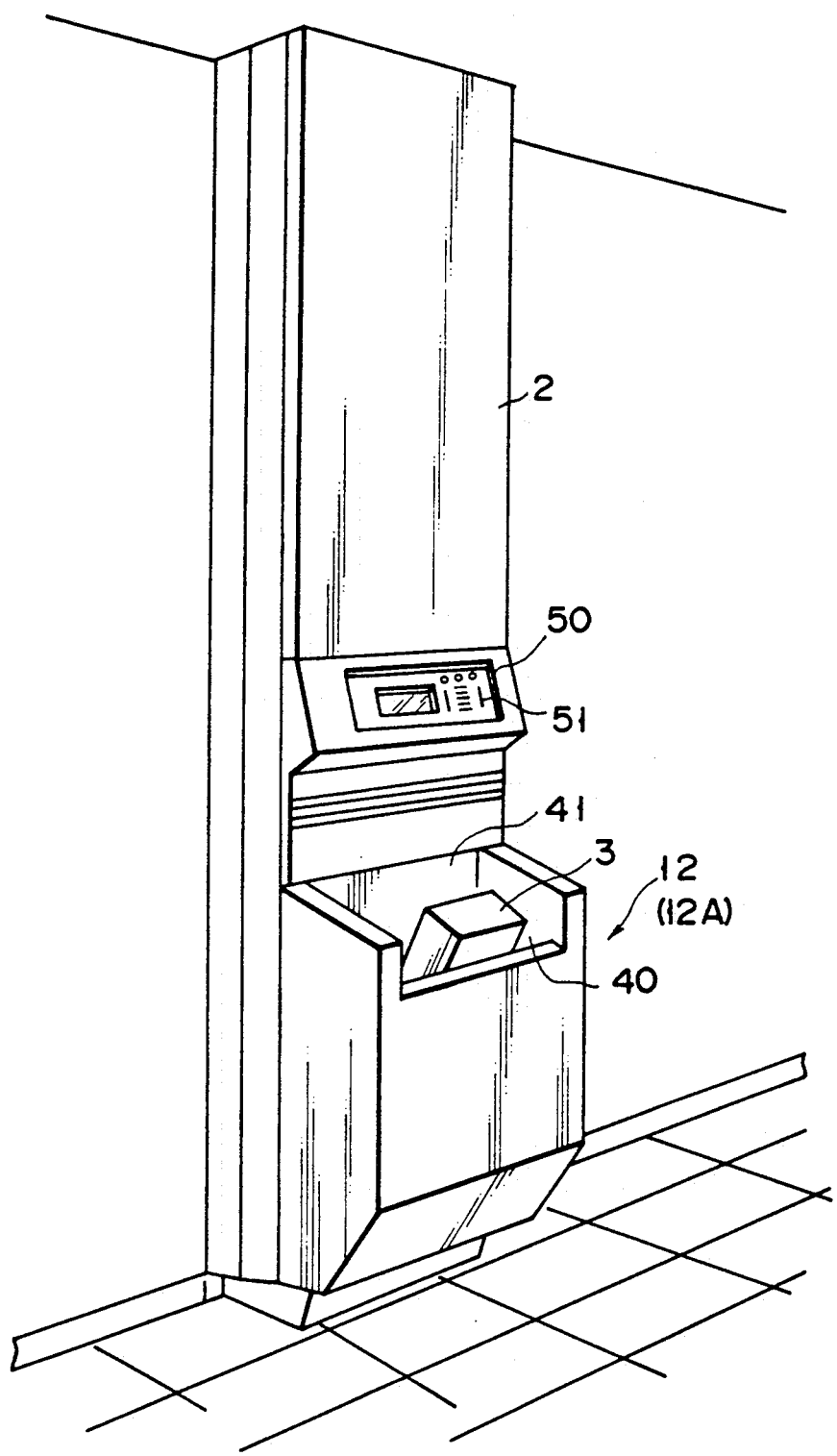
FIG. 8 is a perspective view schematically showing the first station connected to a branch path.

FIG. 8 illustrates one of first stations 12, i.e., station 12A installed in an internist's office. As is shown in this figure, station 12A is put on the wall of the office. Station 12A comprises control section 50 located near and above case transfer section 40. Control section 50 has console panel 51 having various keys and switches. The destination of any case 3 inserted into transfer section 40 is designated by operating the keys and switches of console panel 51. In accordance with the data input by operating console panel 51, which represents the destination of the case, CPUs 95 to $96_1$ to $96_n$ drive linear motor 20, drivers 23, fastening means 32, releasing means 37, and pushing means 45. Control section 50 has two detectors. The first detector detects the arrival of case 3 from main transport path 1. The second detector determined whether the cover 5 of case 3 inserted into case transfer section 40 is opened or closed. When the first detector detects the arrival of case 3, a lamp and a chime, both included in control section 50, are turned on, thereby informing that case 3 has arrived at transfer section 40. When the second detector detects that the cover 5 of case 3 is closed, case 3 is automatically transported from case transfer section 40 to main transport path 1 through branch path 2. When the second detector determines that cover 5 is open, case 3 cannot be transported from section 40.

Transfer section 40 has an alarm means (not shown) which has an element for emitting infrared ray and an element for receiving the infrared ray. The alarm means detects any article which is contained in case 3 and is set in an undesired position. Upon detecting such an article, the alarm means prevents the supply of case 3 from transfer section 40 to main transport path 1 through branch path 2.

Figure 9:
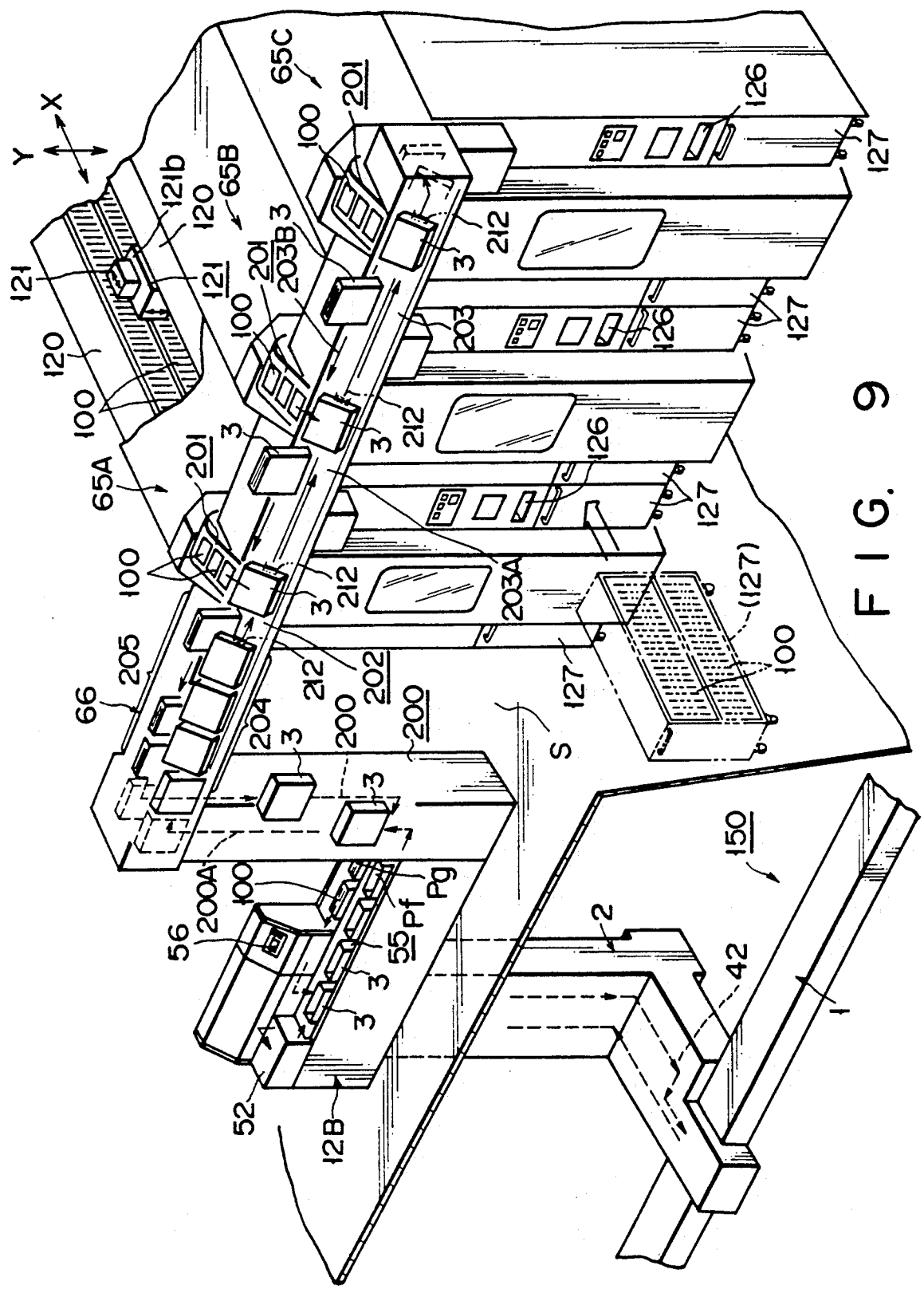
FIG. 9 is also a perspective view illustrating one section of the transport system according to a first embodiment of the present invention.

FIG. 9 illustrates second station 12B, automatic card storages 65A, 65B and 65C, and case transport apparatus 66—all installed in the card storage room on the floor immediately above the floor on which the doctor's offices are built.

Figure 10:
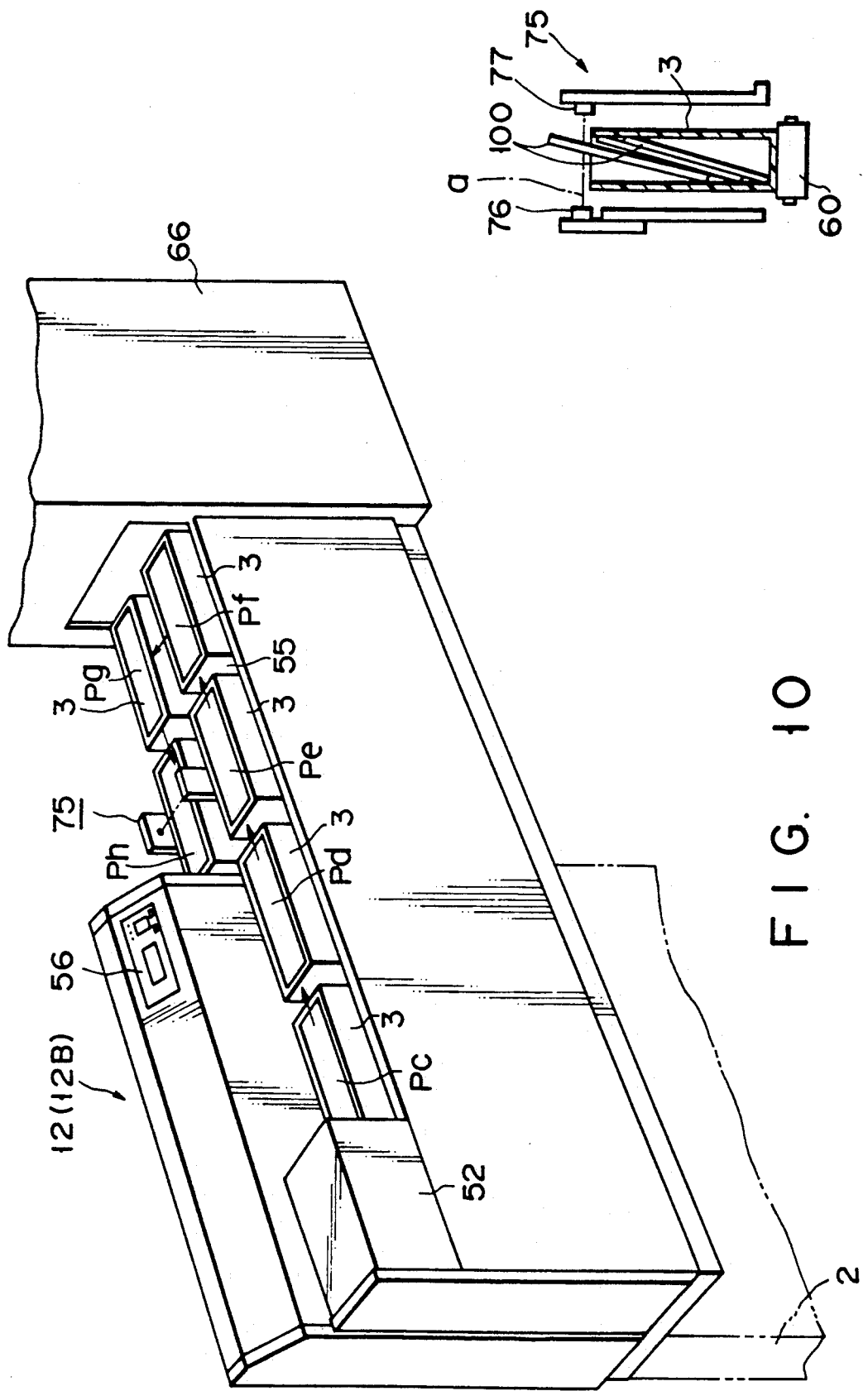
FIG. 10 is perspective view schematically showing the second station connected to a branch path.
Figure 11:
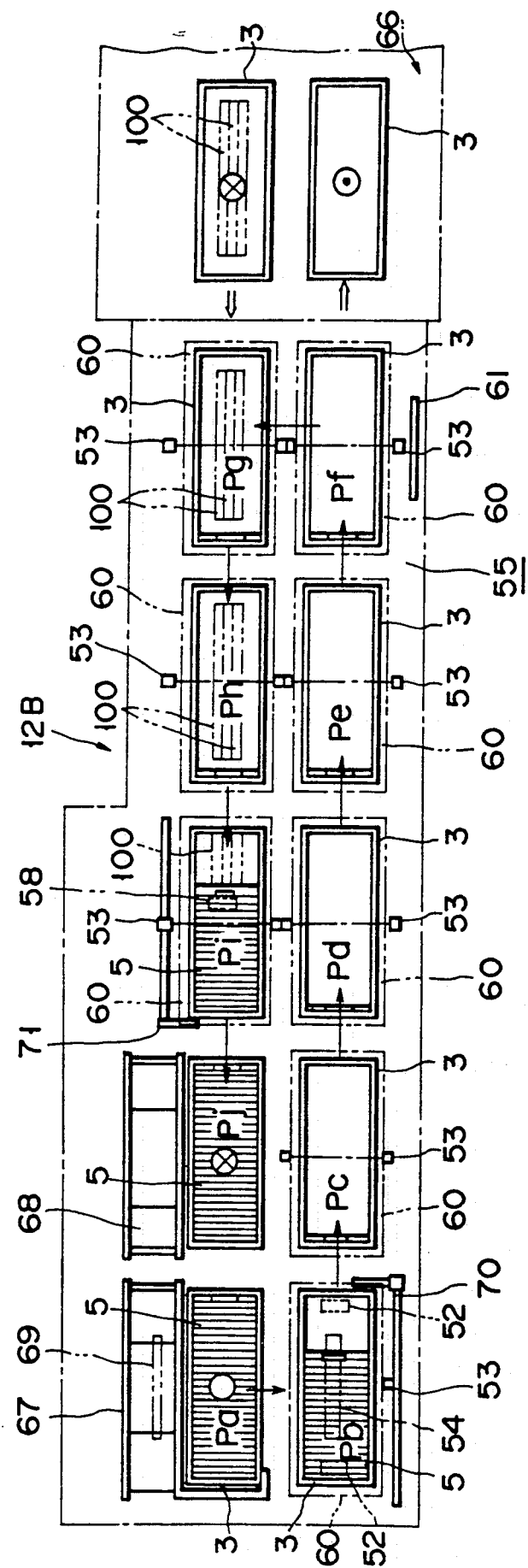

As is shown in FIG. 9, second station 12B is connected to transport means 150 comprised of main transport path 1 and branch path 2. More precisely, station 12B is connected to main transport path 1 by means of branch path 2. Second station 12B is also connected to automatic card storages 65A, 65B and 65C by means of case transport apparatus 66. As is shown in FIGS. 9 and 10, second station 12B has cover-opening mechanism 52, case-collecting section 55, and console panel 56. Further, as is shown in FIG. 11, station 12B has detectors 53, ultraviolet-ray sterilizer 54, cover-closing mechanism 58, case-transferring mechanism 61, and two stopper mechanisms 70 and 71.

Stopper mechanism 70 temporarily stops case 3 transferred to station 12B from branch path 2. While case 3 is being stopped, cover-opening mechanism 52 opens cover 5 of case 3. Then, the first detector 53 determines whether or not case 3 contains any article 100. When case 3 is empty, it is sterilized by ultraviolet-ray sterilizer 54. When case 3 contains article 100 or articles 100, it is not sterilized, thus imposing no influence on articles 100. Thereafter, case 3 is transferred to case-collecting section 55. The moment case 3 arrives at section 55, the lamp and the chime, both included in console panel 56, are turned on, informing of this arrival of case 3. If only one case 3 arrives at section 55, the case is stopped at position Pc shown in FIGS. 10 and 11. Until the next case reaches case-collecting section 55, the lamp and the chime keeps on giving forth an alarm, so that articles 100 are not drawn out of case 3 staying at position Pc. When the next case reaches position Pc, the first case 3 is moved forward to position Pd and then to position Pe. While case 3 is staying at positions Pd and Pe, articles 100, if any in case 3, are removed from case 3. As case 3 moves from position Pc to position Pe, three detectors 53 located at positions Pc, Pd, and Pe, respectively, determine whether or not case 3 contains articles 100. If case 3 at position Pf contains articles 100, it is transferred to position Pg by case-transferring mechanism 61 located near position Pf. If case 3 at position Pf is empty, it is transported to storage 65A, 65B or 65C by means of case transport apparatus 66. The desired medical cards, i.e., articles 100, are removed from automatic card storage 65A, 65B or 65C and inserted into empty case 3. Case 3, now containing articles 100, are returned to position Pg of second station 12B by means of case transport apparatus 66.

All empty cases 3 are transferred from position Pf onto case transport apparatus 66 which is connected to automatic card storages 65A, 65B and 65C.

It is at position Ph that articles 100 can be inserted into any empty case 3. Also, at position Ph, the destination of case is designated by the data recorded on medical cards 100 contained in case 3 or by the data input by operating console panel 56. Case 3 is moved from position Ph to position Pi, where stopper mechanism 71 stops case 3 temporarily. While case 3 is being stopped at position Pi, cover-closing mechanism 58, which is located at position Pi, closes cover 5 of case 3. Case 3, thus closed, is transferred downward from second station 12B to main transport path 1 through branch path 2. It is then transported to its destination, i.e., a doctor's office or a clerical office through main transport path 1 and the branch path 2 provided on the wall of said office.

The cover 5 of case 3 is opened while case 3 is staying at positions Ph and Pg, both preceding position Pi. The destination of case 3 may be designated while case 3 is open at position Ph or Pg. Articles 100 may be inserted into case 3 either manually or automatically. Case 3 is moved from position Pa to position Pj by means of belt conveyors 60 located at positions Pa to Pj, which are driven independently under the control of central processing section 99 (shown in FIG. 14, and later described). Detectors 53, which are located at positions Pb to Pi, emit light into each case 3 through hole 4A of the case, thereby to determine whether or not case 3 contains articles 100. Hence, detectors 53 help to determine whether case 3 is to be transported to any automatic card storage or to a doctor's office or a clerical office, and also helps to conform the destination of case 3.

Vertical conveyor belt 67 extends downward from position Pa of second station 12B, for lifting case 3 from branch path 2 to position Pa. Case transfer mechanism 69 is located at position Pa, for transferring case 3 from position Pa to position Pb. Vertical belt conveyor 68 extends downward from position Pj, for lowering case 3 from position Pj to branch path 1. Further, as is shown in FIGS. 10 and 12, detector 75 is located at position Ph, for detecting any article 100 projecting from case 3. This detector 75 comprises a photosensor having light-emitting element 76 and light-receiving element 77. Elements 76 and 77 face each other, and are positioned at the sides of the case-transfer path. The common optical path of elements 76 and 77 extends horizontally, slightly above the top of case 3. Therefore, if article 100 projects from the top of case 3, it shields the light beam emitted from element 76, whereby it is determined that article 100 is contained, not completely within case 3. When this fact is detected, case 3 is stopped, and the lamp and the chime, both included in console panel 56, are turned on, thus informing the operator that at least one article 100 is projecting from case 3.

FIG. 13 shows console panel 56 of second station 12B installed in the card storage room. Console panel 56 is operated to control the transport and transfer of case 3 within section 12B. Further, panel 56 displays the movement of case 3 within section 12B, the destination of case 3, and the condition of articles 100 contained in case 3—all monitored by detectors 53 and 75.

Console panel 56 is connected to a computer (not shown), and displays the above-mentioned information under the control of this computer. The signals input by operating the keys and switches (later described) provided on panel 56 are processed by the computer, thereby to transport case 3 to any desired office. More specifically, panel 56 has display 79, numeral-key pad 80, dispatch button 81, correction button 82, interrupt button 83, and mode-switching button 84.

Display 79 displays the destination (i.e., the name of station 12A) of case 3 which has arrived at station 12B or is to be dispatched from station 12B. It also displays arrows. These arrows indicate the order in which cases 3 have arrived at station 12B or are to be dispatched from station 12B, and also specify the number of cases 3 which are temporarily mounted on stage 42 connected to branch path 2. Any arrow is displayed on and off repeatedly, thus informing that the corresponding case is empty and moving on stage 42.

The keys of numeral-key pad 80 are selectively operated, thereby to input the code number of the destination of case 3. Upon inputting this code number, display 79 displays the destination of case 3. When the number thus displayed is incorrect, the operator pushes correction button 82 and then operates key pad 80, thereby inputting the correct code number. When the number displayed on display 79 is correct, the operator pushes dispatch button 81, thereby to dispatch case 3 to its destination from second station 12B. To designate the destination of any other case 3, the operator pushes interrupt button 83 and then operates numeral-key pad 80, thus inputting the code number of this case. To operate second station 12B independently of automatic card storages 65A, 65B and 65C, the operator pushes mode-switching button 84. The keys and buttons provided on console panel 56 are connected to a control device (not shown). The control device controls the transport of case 3 in accordance with the operation of these keys and buttons.

Articles 100 removed from automatic card storage 65A, 65B or 65C are automatically inserted into any empty case 3 that is in the case transport apparatus 66. This case is transported to station 12A installed in, for example, the internist's office, from case transport apparatus 66 via second station 12B, branch path 2, main transport path 1, and the branch connected to station 12A. Also, articles 100, used in each office and being no longer necessary, are inserted into any empty case 3. This case, now containing articles 100, is transported from station 12A installed in the office, to case transport apparatus 66 via branch path 2 connected to station 12A, main transport path 1, branch path 2 connected to station 12B, and station 12B. After case 3 has reached apparatus 66, articles 100 are automatically removed from the case 3 and then filed into automatic card storage 65A, 65B or 65C.

As has been explained above, the transport system according to the present invention transports the medical cards, i.e., articles 100, from any automatic card storage 65A, 65B or 65C to any desired office, and also vice versa.

Figure 14:
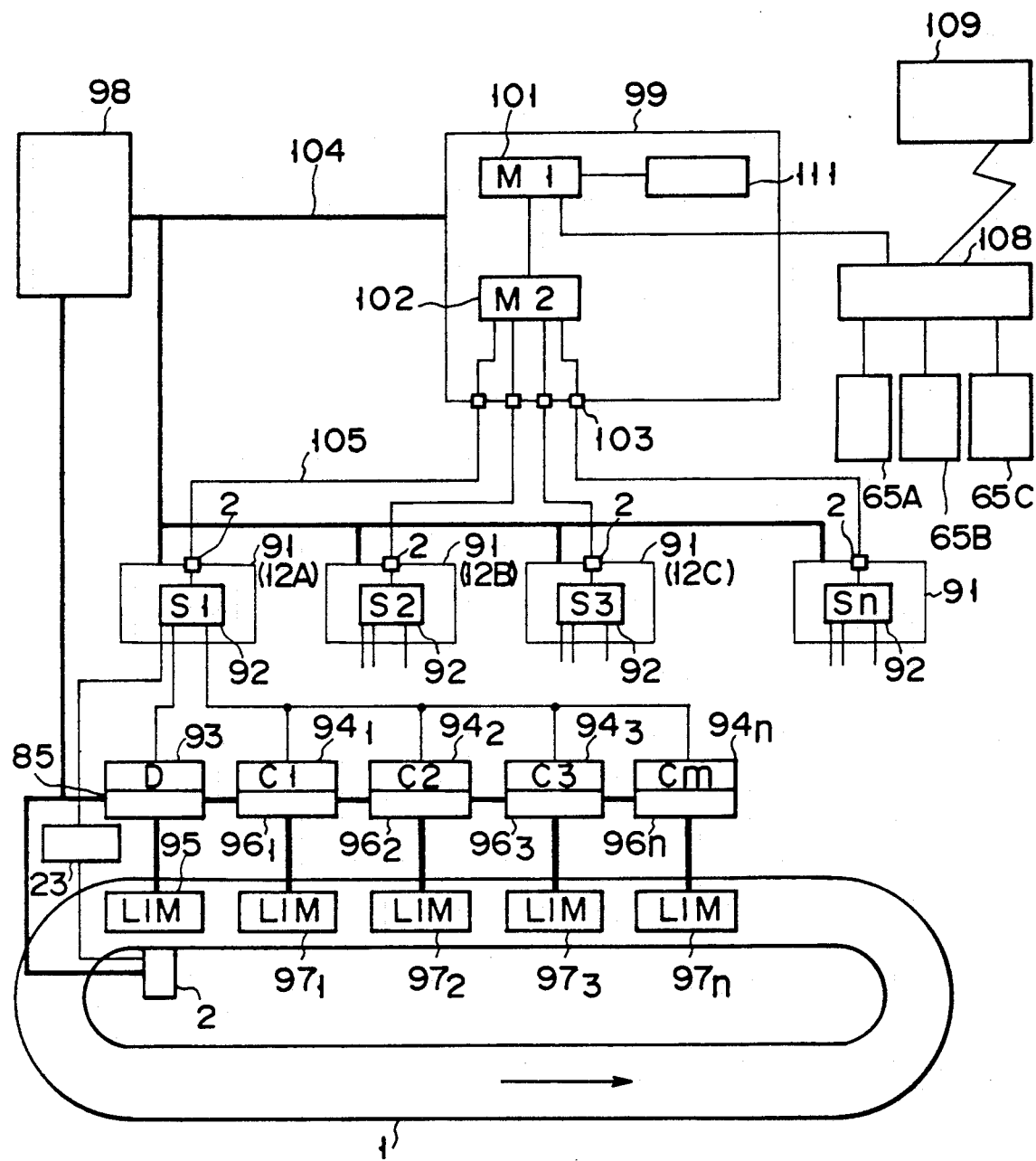
FIG. 14 is a diagram showing the control unit of the transport system.

FIG. 14 is a block diagram showing the control unit of the transport system. As is illustrated in this figure, stations $91_1$ (12A), $91_2$ (12B), $91_3$ (12C), ..., $91_n$ are installed in the internist's office, the card storage room, the pediatrist's office, and so forth, respectively. Stations $91_1$ (12A), $91_2$ (12B), $91_3$ (12C), ..., $91_n$ are provided with CPUs $92_1$ (S1), $92_2$ (S2), $92_3$ (S3), ..., $92_n$ (Sn), respectively. These CPUs, $92_1$ (S1), $92_2$ (S2), $92_3$ (S3), ..., $92_n$ (Sn) are provided to control thrust means 19 of linear induction motors 95 and $97_1$ to $97_n$. CPU $92_1$ (S1) is connected to CPU 93 for designating the position where carrier 14 is to be stopped, and also to CPUs $94_1$ to $94_n$ for controlling the speed of carrier 14. Hence, carrier 14 travels in main transport path 1 in the direction of the arrow shown in FIG. 14, under the control of CPU 93 and CPUs $94_1$ to $94_n$. CPUs $92_1$ (S1), $92_2$ (S2), $92_3$ (S3), ..., $92_n$ (Sn) are connected to drivers 23 for moving cases 3. CPU 93 (D) is coupled by inverter 85 to linear induction motor (LIM) 95. Other CPUs $94_1$ to $94_n$ are connected to CPUs $96_1$ to $96_n$, respectively, which are in turn connected to linear induction motors $97_1$ to $97_n$ (LIMs) for controlling the speed of carrier 14. Hence, cases 3 are transported and stopped in main transport path 1 under the control of CPUs $96_1$ to $96_n$ (SSCs).

CPUs $92_1$ to $92_n$ incorporated in stations $91_1$ to $91_n$ are controlled by central processing section 99. Central processing section 99 is connected to central console 98. Central console 98 has monitor panel 111, main controller 101, and auxiliary controller 102. Monitor panel 111 is connected to main controller 101. Main controller 101 controls the transfer of carriers 14. Auxiliary controller 102 is connected to main controller 101; it controls the signals for driving drivers 23, in response to error signals representing the troubles which have occurred or are occurring in branch path 2. When a trouble has occurred or is occurring in, for example, branch path 2 connected to station $91_3$ (12C), cases 3 are prevented from being transferred between this branch path and that portion 22 of main transport path 1 which is coupled to the branch path.

Figure 15:
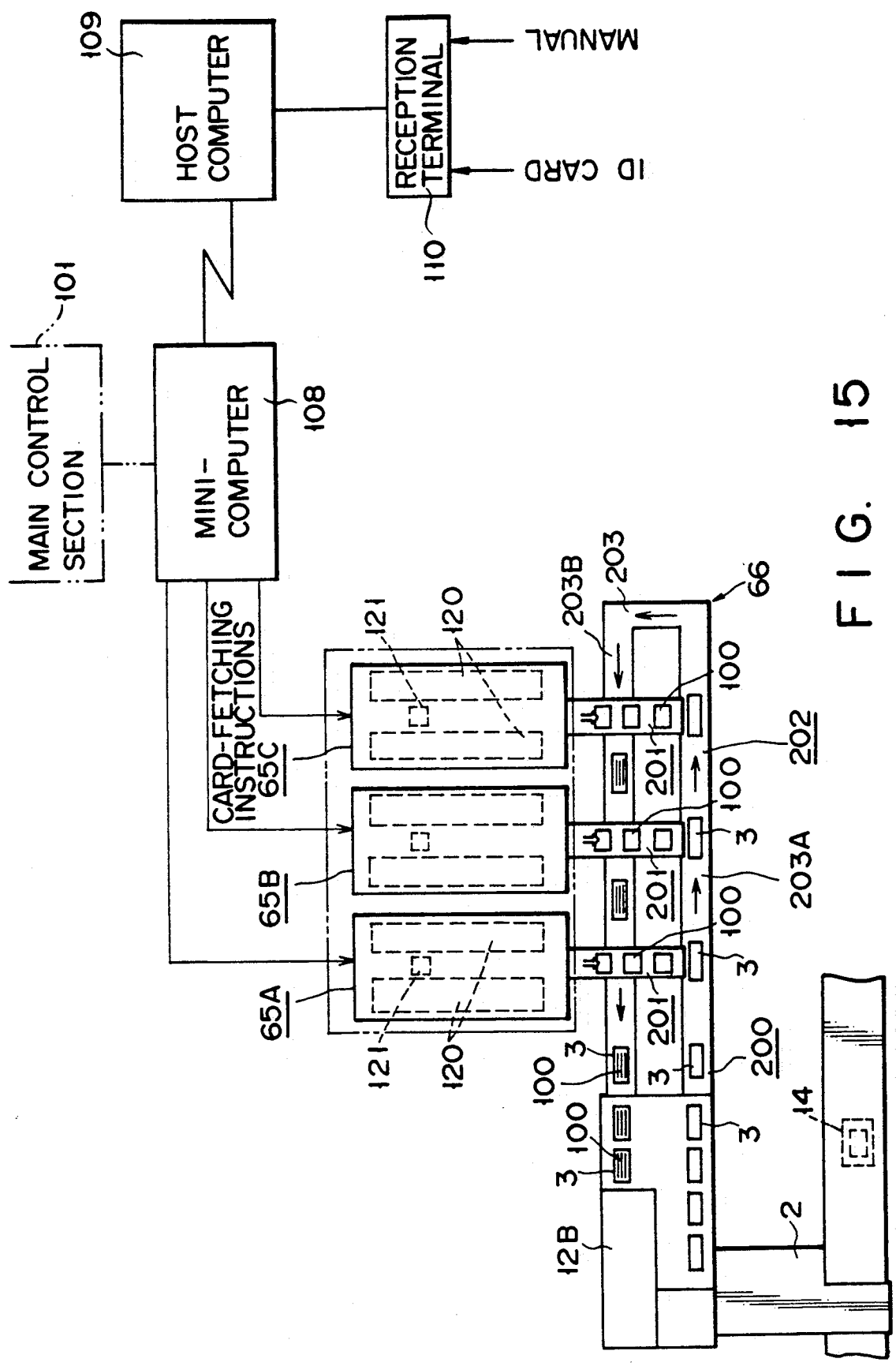
FIG. 15 schematically represents the main port of the control unit shown in FIG. 14.

Photosensor 103 is incorporated in each of stations $91_1$ to $91_n$. Whenever a trouble occurs in the station, photosensor 103 generates a signal. This signal is input to auxiliary controller 102. In FIG. 14, thick lines 104 represent AC power-supply lines, and thin lines 105 designate DC signal lines. Automatic card storages 65A, 65B and 65C are connected to minicomputer 108, which in turn is coupled to main controller 111. Minicomputer 108 is also connected to host computer 109. As is shown in FIG. 15, host computer 109 is connected to reception terminal 110 having a console panel.

It will now be explained how the transport system operates. First, the console panel of reception terminal 110 is operated, thereby inputting data items such as a patient's ID number, his or her doctor's ID number and the priority of his or her medical card. Minicomputer 108 processes these data items, and gives card-fetching instructions to automatic card storage 65A, 65B or 65C. Patient's card 100 with a cover labeled the patient's ID number is automatically delivered from the card storage which has received the instructions. Card 100 and other medical cards 100 are classified in a specific method (later described) in accordance with their destinations. Cards 100, which should be transported to the same doctor's office, are inserted into the same case 3. Minicomputer 108 supplies main controller 101 (M1) of central processing section 99 with data representing the destination of these cards 100, e.g., station $91_1$ (12A). As a result, CPU 92 incorporated in station $91_1$ supplies speed/stop signal to linear induction motors (LIMs) 95 and $97_1$ to $97_n$ via CPUs 93 and $94_1$ to $94_n$. Hence, LIMs 95 and $97_1$ to $97_n$ apply a thrust and then a braking force to carrier 14 which supports case 3 containing cards 100. Carrier 14 therefore is moved and stopped at that portion 22 of main transport path 1 which is connected to branch path 2 extending to station $91_1$ (12A). In response to a drive signal supplied from CPU 92, driver 23 located near portion 22 moves case 3 from carrier 14 into branch path 2. As a result, case 3 is transported to the office of the patient's doctor.

According to the present invention, in order to supply cards 100 to the office where they are required, as soon as possible, cards 100 are individually delivered from automatic card storages 65A, 65B and 65C. Minicomputer 108 controls the destinations of cards 100 delivered from the automatic card storages.

Now, automatic card storages 65A, 65B and 65C, and card transport apparatus 66 for transporting cards 100 from the automatic card storages to second station 12B will be described with reference to FIG. 9 and FIGS. 15 to 18.

Automatic card storages 65A, 65B and 65C have the same structure. Each automatic card storage has two cabinets 120 which extends parallel to each other and define a passage between them. Each cabinet 120 has several shelves. Therefore, cards 100 are mounted on these shelves, in rows and columns. The data items representing positions of cards 100 mounted on the shelves of either cabinet are stored in minicomputer 108. Each data item consists of the ID number of the cabinet, and the position (x) of card 100 in respect of the X direction, and the position (y) of the shelf on which card 100 is placed. The ID numbers of these cards, more precisely the ID numbers of the patients, which are printed or labeled on the covers of cards 100, are also stored in minicomputer 108. Robot 121 is provided in the passage between cabinets 120. It has body 121A and head 121B (FIG. 9). Body 121A can travel along the passage, that is, in the X direction. Head 121B can move vertically, that is, in the Y direction. Head 121B has a pair of arms 136 (FIG. 17) which can hold card 100.

To remove card 100 from any cabinet 120, the ID number of this cabinet and the position data items (x) and (y) representing the position of the card in this cabinet are read from minicomputer 108. The ID number of the cabinet selects one of three robots 121. Data items (x) and (y) are supplied to the selected robot 121. Body 121A of robot 121 moves in accordance with data item (x), whereas head 121B thereof moves in accordance with data item (y). As a result, arms 136 of robot 121 are positioned at the place where the desired card 100 is placed. Arms 136 are automatically operated, thus holding the card and then pulling it from cabinet 120. Then, body 121A of robot 121 moves to the entrance of the passage between two cabinets 120, and arms 136 release card 100. Card 100 falls onto chute 125 (FIG. 18) located at the entrance of the passage. Card 100 slides down on chute 125 and is transferred into card outlet 126 (FIG. 9), from which card 100 can be removed by hand.

To return cards 100 to cabinets 120 of automatic card storage 65A, 65B or 65C, these cards 100 are placed in lack wagon 127, and wagon 127 is pushed into the passage of the automatic card storage. Arms 136 of robot 121 remove each card 100 from lack wagon 127. A reader (not shown) reads the ID number of card 100, and supplies this ID number to minicomputer 108. Upon receipt of the ID number, minicomputer 108 supplies the position data items (x) and (y) to robot 121. In accordance with these data items, body 121A and head 121B of robot 121 move, whereby card 100 is placed at the position (x, y) in cabinet 120.

Figure 16:
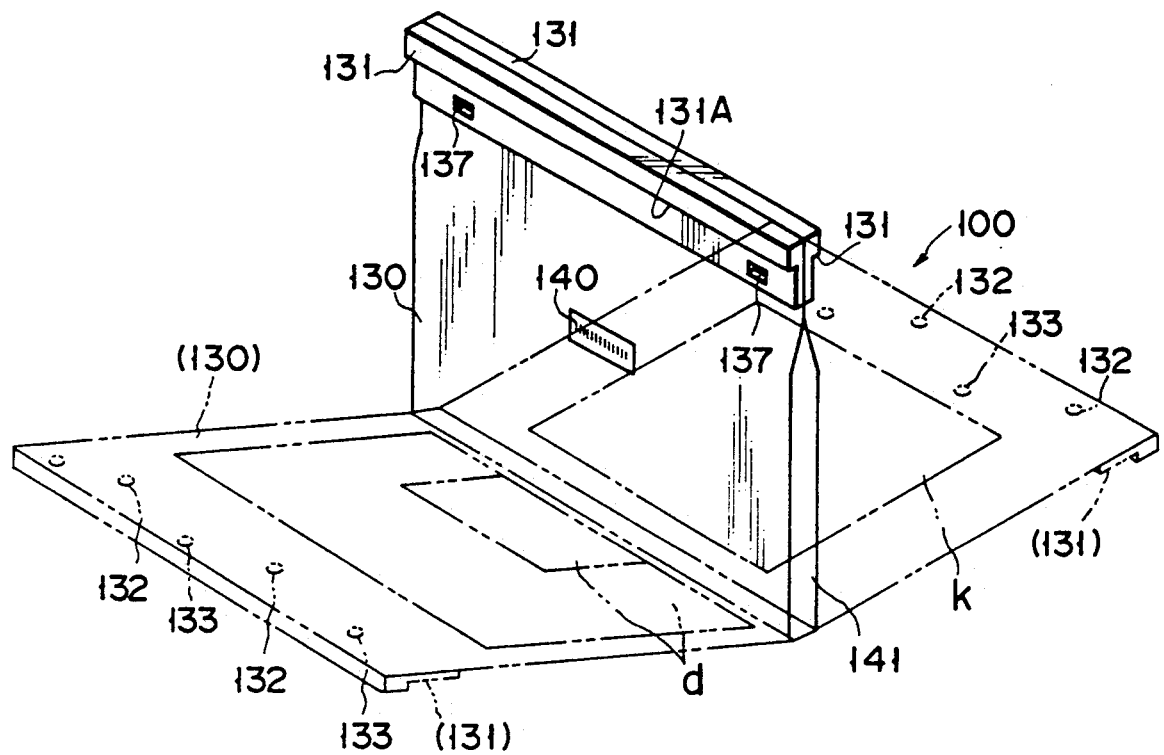
FIG. 16 is a perspective view of a medical card having a cover, which is an article the transport system is to transport.
Figure 17:
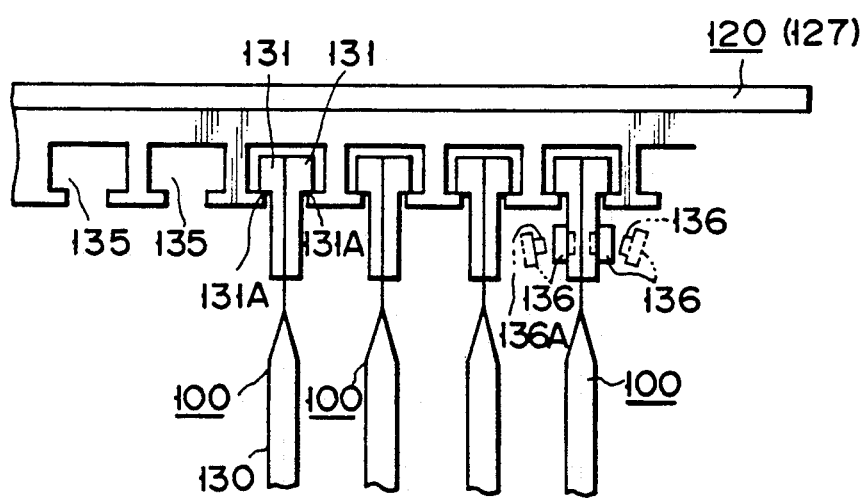
FIG. 17 is a diagram explaining how the medical card (FIG. 16) is stored on a shelf.

FIG. 16 shows medical card 100 having a cover. As is shown in this figure, article 100 such as card K of slip D is inserted in the ga between two halves of folded cover 130 made of a hard sheet. Two reinforcing members 131 are formed integrally with the free edges of the sheet halves. Either members 131 has projections 132 and depression 133 in that surface which faces the other reinforcing member. Projections 132 are positioned such that they fit into depressions 133 of the other reinforcing member when both members 131 are combined. Similarly, depressions 133 are positioned such that they receive the projections 132 of the other reinforcing member when both members 131 are combined. Once reinforcing members 131 are fastened together, article 100 is held within cover 130. Bar code 140 representing the patient's ID number or the like is printed or labeled on the outer surface of cover 130. Bar code 140 is optically read as cover 130 holding medical card 100 is taken from cabinet 120, and card 100 is identified with the ID number represented by bar code 140.

Folded cover 130 is opened by separating reinforcing members 132 and 133 from each other, as is indicated by two-dot, one-dash lines in FIG. 16. Each reinforcing member consists of thick upper portion 131A and a thin lower portion. Upper portion 131A is so shaped as to fit slidably into grooves 135 cut in any overhead rail of cabinet 120 and also into grooves 135 cut in any overhead rail of lack wagon 127. Hence, cover 130 can be suspended from the overhead rail and can slide along grooves 135. Moreover, either reinforcing member 131 of each cover 130 has two holes 137. These holes 137 are used to remove cover 130, and thus card 100 held in cover 130, from cabinet 120 or lack wagon 127. More specifically, either arm 136 of robot 121 has two projections 136A. These projections 136A are inserted into holes 137 of reinforcing member 131 as arms 136 clamp the lower portions of members 131. Once projections 136A of both arms 136 have been fitted into holes 137, cover 130 is steadily held by arms 136, never tilting or slipping out of arms 136. This ensures the reliable insertion of card 100 into cabinet 120 or lack wagon 127, and also the smooth withdrawal of card 100 therefrom.

As is shown in FIG. 9, automatic card storages 65A, 65B and 65C are connected to station 12B by card transport apparatus 66. Apparatus 66 comprises vertical transport section 200 for transporting cases 3 in the substantially vertical direction, and horizontal transport section 202 for transporting cases 2 in the horizontal direction. Horizontal transport section 202 is connected to the outlets of automatic card storages 65A, 65B and 65C. Vertical transport section 200 extends upward to the ceiling of the card storage room. Its upper end is connected to one end of horizontal transport section 202, and its lower end to that end of station 12B which is opposite to the end coupled to branch path 2.

Figure 18:
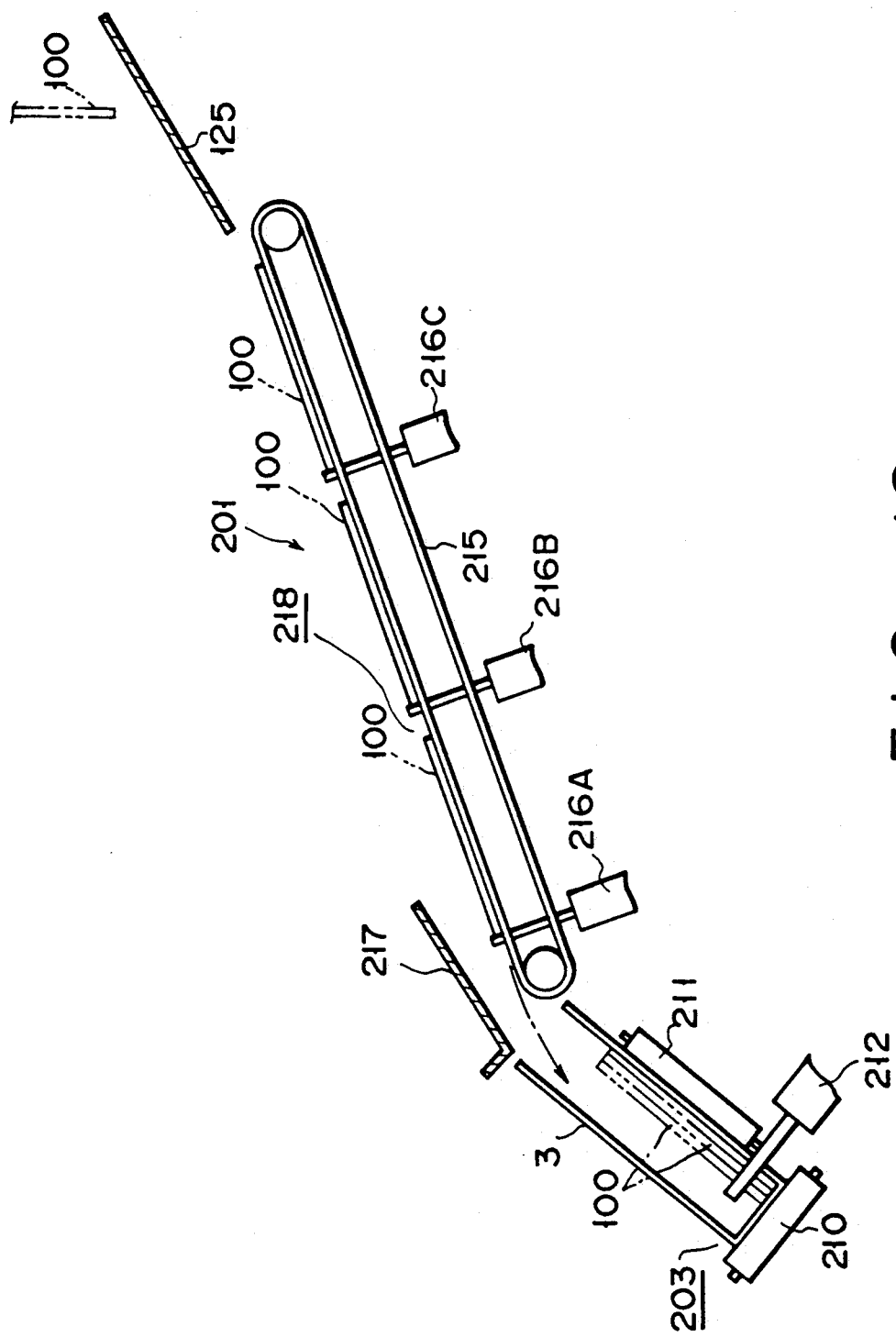
FIG. 18 shows a mechanism for inserting medical cards into the case.

Vertical transport section 200 comprises upward transport path 200A (not shown in detail) and downward transport path 200B (not shown in detail, either). Upward transport path 200A is designed to transport cases 3 from position Pf of case-collecting section 55 to horizontal transport section 202. Downward transport path 200B is designed to transport cases 3 from horizontal transport section 202 to position Pg of section 55. The upper end of vertical transport section 200 is connected to horizontal transport section 202. Section 202 extends horizontally along the ceiling of the card storage room, and connected to three case-ejecting sections 201 connected to automatic card storages 65A, 65B and 65C. Since section 202 is located close to the ceiling of the card storage room, large space S is provided below horizontal transport section 202, and the room is efficiently used. Horizontal transport section 202 has U-turn path 203. Buffer sections 204 and 205 are provided at the ends of this U-turn path 203, respectively. Either buffer section is large enough to support several cases 3 at the same tim. The forward path 203A of U-turn 203 is inclined to the floor of the card storage room, as is illustrated in FIG. 18. Belt conveyors 210 and 211 are provided in forward path 203A. Belt conveyor 210 supports the bottoms of cases 3, whereas belt conveyor 211 contacts the side of each case 3. Several stopper mechanisms 212 are arranged along forward path 203A, for stopping cases 3. These mechanisms 212 are controlled by a central control section (not shown), so as to stop cases 3 at positions where cases 3 face card-ejecting means 201.

Covers 130 each containing one card 100, which have been supplied from chutes 125 functioning as the outlets of automatic card storages 65A, 65B and 65C, are transported onto forward path 203A by means of conveyor belt 215 of card-ejecting means 201, as is illustrated in FIG. 18. Stopper mechanisms 216A, 216B and 216C are arranged along conveyor belt 215, to stop covers 130 temporarily. These mechanisms 216A, 216B and 216C, which can move along belt 215, stop covers 130 at predetermined positions on conveyor belt 215. Hence, belt 215 and stopper mechanisms 216A, 216B and 216C function as buffer means 218. When a specified case 3 reaches the outlet of conveyor belt 215, stopper mechanism 216A releases cover 130, whereby cover 130 is ejected into case 3.

Case 3 is shaped and sized so as to contain five covers 130. Nonetheless, at most three covers 130 are allowed to be ejected into case 3, thereby leaving sufficient space within case 3. Case 3 is inclined to card-ejecting means 201, and cover 130 is ejected into case 3 from means 201 in the path indicated by the arrow shown in FIG. 18. Therefore, cover 130 does not collide with any cover already inserted in case 3. Guide 217 is located at the distal end conveyor belt 215, for guiding cover 130 into case 3 even if cover 130 warps upwardly by accident. Card-ejecting means 201 and U-turn path 203 are controlled by minicomputer 108 such that the medical card 100 of any patient visiting the hospital is transported to second section 12B.

With reference to FIGS. 1, 2, 15 and 19, it will now be explained how covers 130 each containing a medical card 100 are transported from any automatic card storage 65A, 65B or 65C to any desired destination, i.e., a doctor's office or a clerical office, and how they are transported from the office back to the automatic card storage.

First, every patient visiting the hospital presents his or her ID card to the receptionist. The receptionist operates reception terminal 110, this inputting the patient's ID number to host computer 109. Host computer 109 determines how many persons must see the doctor before this patient. Hence, the ID numbers of the visiting patients are supplied from host computer 109 to minicomputer 108. In accordance with the ID numbers, minicomputer 108 supplies instructions to one of automatic card storage, for fetching medical cards 100 which are to be transported to the same destination, i.e., the same doctor's office. In accordance with the card-fetching instructions, robot 121 removes covers 130 containing the desired cards from cabinets 120 of the automatic card storage 65A, 65B, or 65C. Robot 121 then carries covers 130 to chute 125 (FIG. 18) and releases these covers onto chute 125. Covers 130 are then transferred onto conveyor belt 215 of card-ejecting means 210, one after another, as is illustrated in FIG. 18. Eventually, covers 130 are transported toward U-turn belt 215. When the first cover 130 reaches the distal end of conveyor belt 215, it is temporarily stopped by stopper mechanism 216A. At this time, the second cover 130 and the third cover 130 are temporarily stopped by stopper mechanisms 216B and 216C, respectively. As has been described, minicomputer 108 stores the data items representative of the destination and position of every card 100 withdrawn from cabinet 120.

Covers 130 laid on conveyor belt 215 are then sorted into cases 3 being transported by U-turn belt 215 in accordance with the destination of cards 100 contained in these covers 130. Minicomputer 108 controls each card-ejecting means 201 and card transport apparatus 66 such that three or less covers 130 are inserted into one case 3. That is, minicomputer 108 controls the timing each card-ejecting means 201 ejects each cover 130 into case 3. To be more specific, minicomputer 108 controls the stopper mechanisms 216A, 216B and 216C of card-ejecting means 201. Also minicomputer 108 controls the forward path 203A of U-turn path 203 incorporated in case transport apparatus 66. Hence, three or less covers 130 containing cards 100, which are to be transported to the same destination, are ejected into the same case 3.

Figure 19A:
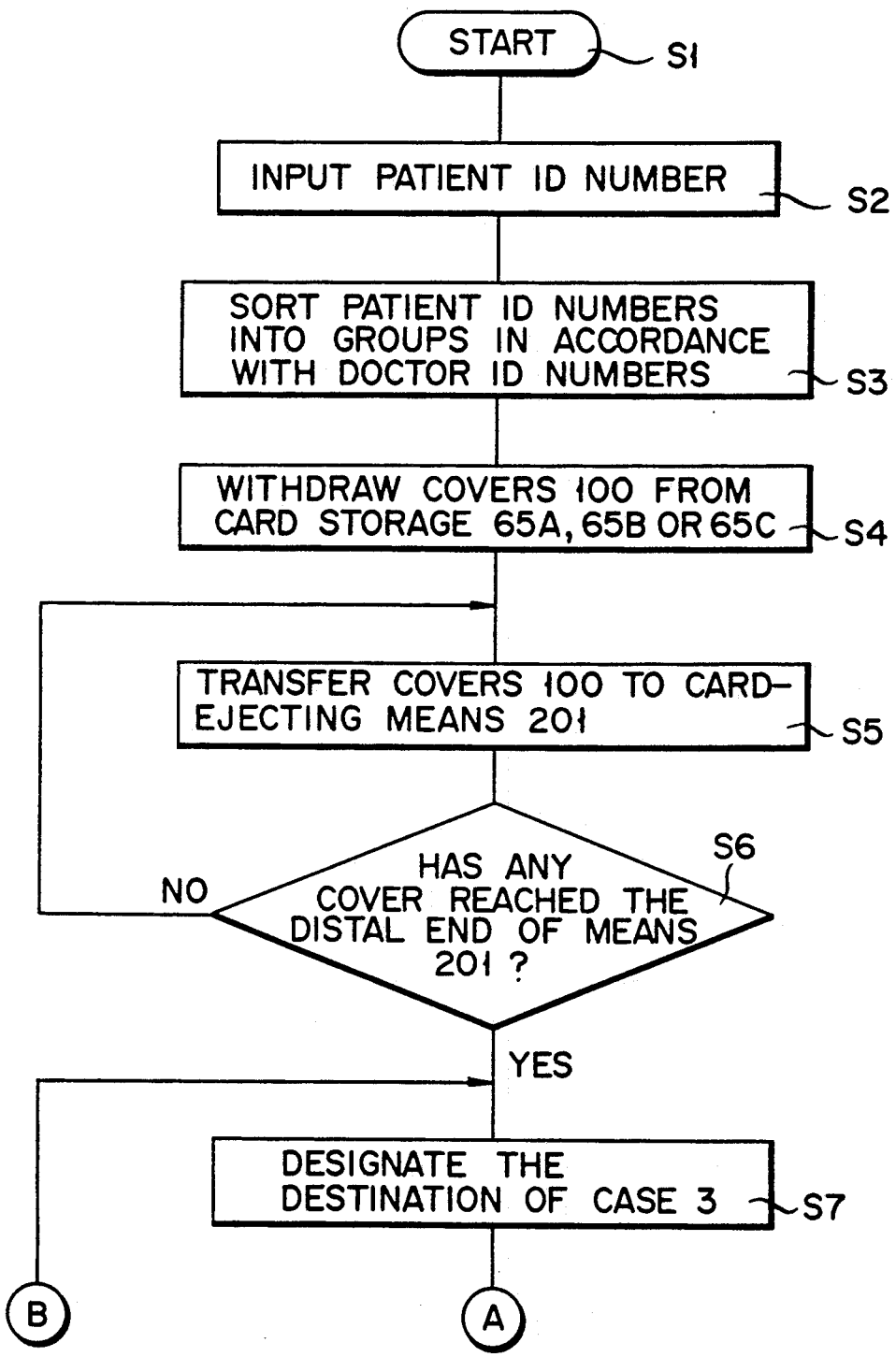
FIGS. 19A to 19C are a flow chart explaining how medical cards each having a cover, which have been delivered from three automatic card storages, are classified in accordance with their destination.
Figure 19B:
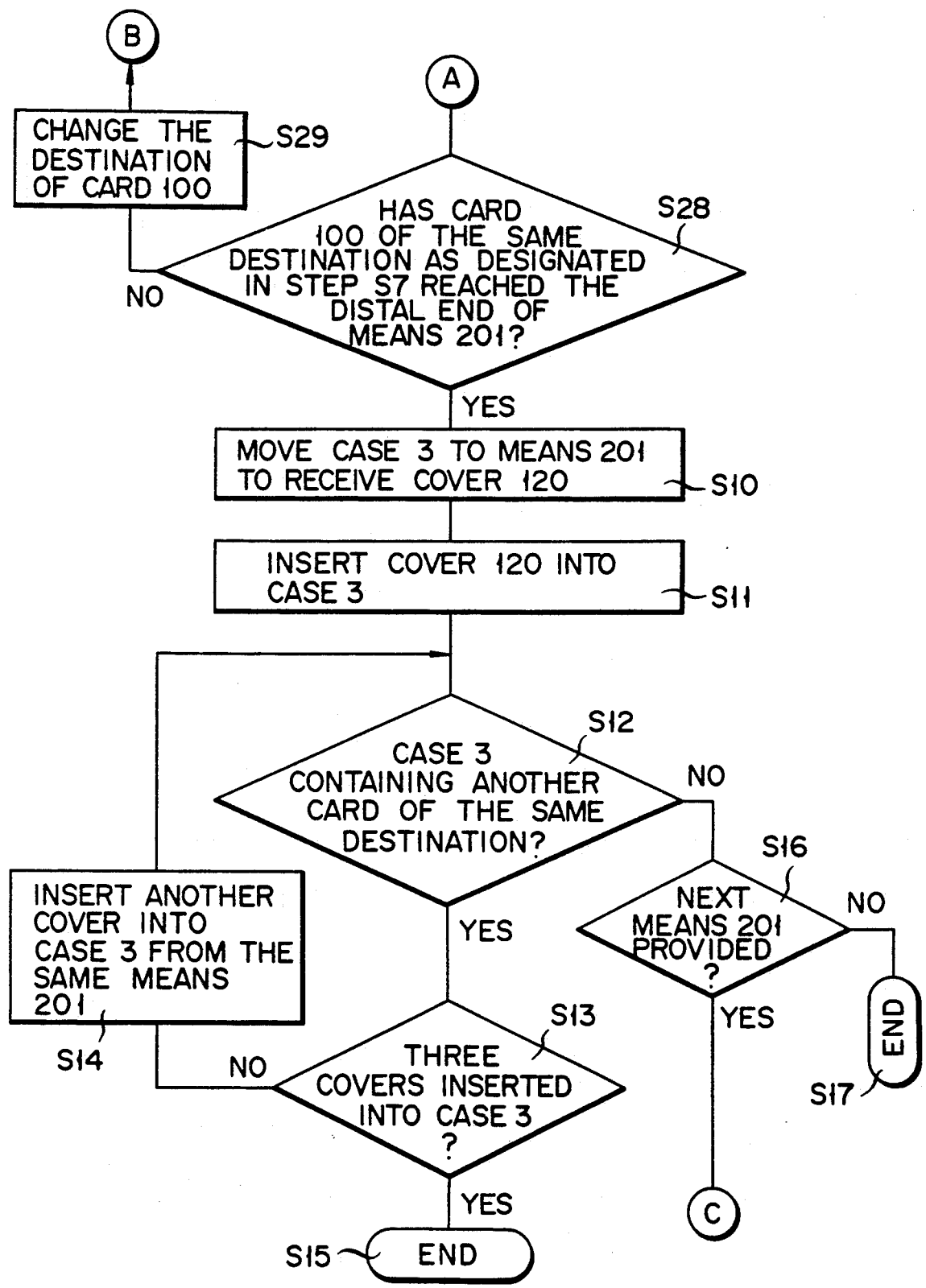
Figure 19C:
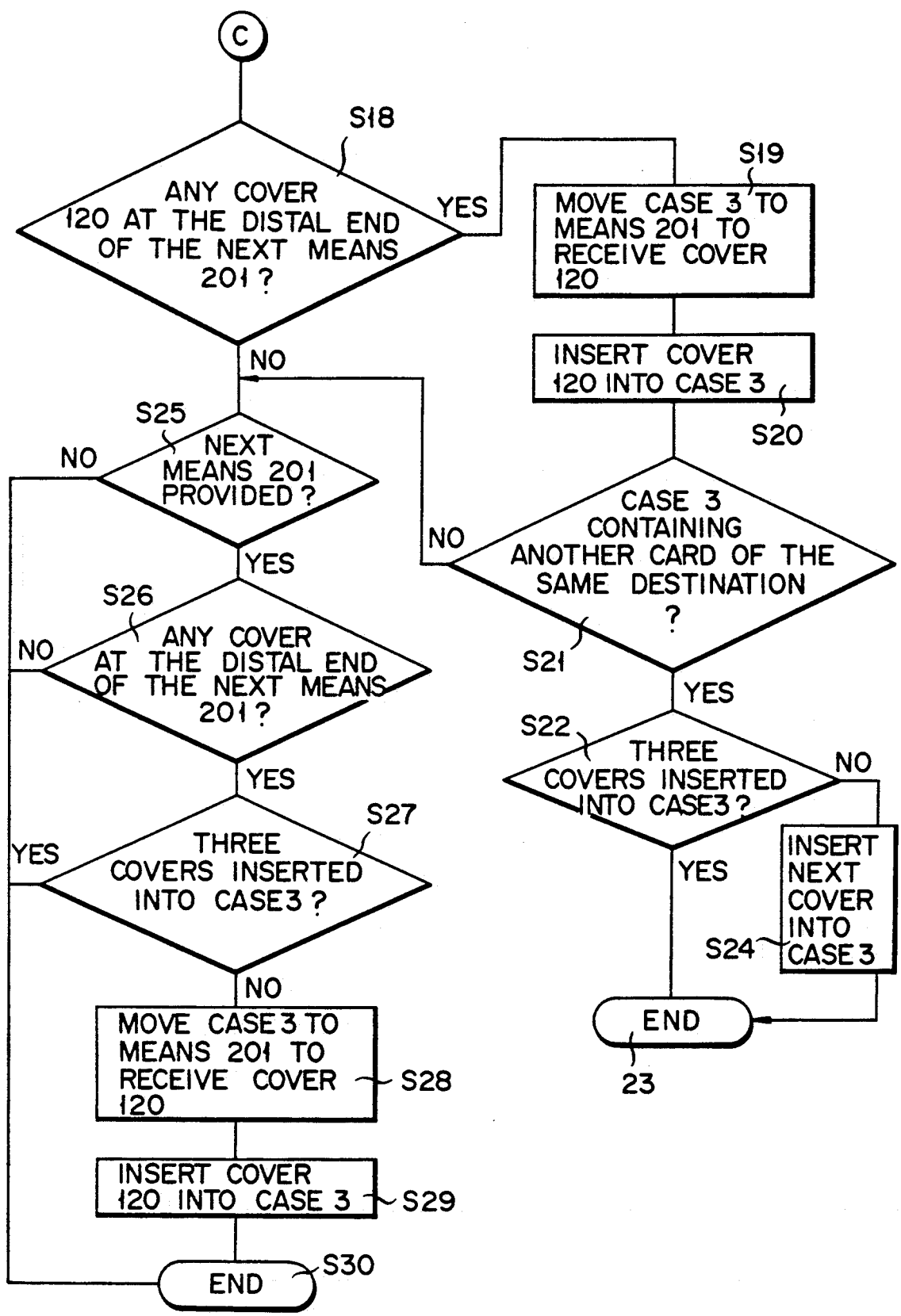

Now, with reference to the flow chart of FIGS. 19A to 19C, it will be described, in greater detail, how covers 130 are withdrawn from the three automatic card storages, and how they are ejected into case 3.

First, in step S2, the receptionist operates reception terminal 110, thus inputting the ID numbers of the visiting patients, and also the serial numbers of the patients so that in which order they should see the doctors. Then, in step S3, the patient ID numbers and the ID codes of their doctors are stored into minicomputer 108, and the patient ID numbers are sorted into groups in accordance with the doctor ID codes. The patient ID numbers of each group are supplied from minicomputer 108 to the corresponding automatic card storage 65A, 65B or 65C. In step S4, robot 121 withdraws covers 130 from cabinets of the card storage, in accordance with the patient ID numbers. Robot 121 removes, one at a time, three or less covers 130 containing cards 100 of the same destination from the automatic card storage 65A, 65B or 65C. Then, in step S5, robot 121 transfers covers 130 to card-ejecting means 201. In step S6, it is determined whether or not any cover 130 has reached the distal end of any card-ejecting means 201. If YES, the operation goes to step S7, in which the destination of case 3 travelling in U-turn path 203 is designated in accordance with the destination of card 100 contained in this cover 130. If NO in step S6, steps S5 and S6 are repeated, until a cover 130 reaches the distal end of any card-ejecting means 201. Then, the operation advances to step S8. In this step, it is determined whether or not cover 130 containing a card 100 of the same destination as the designated destination of case 3 has reached the distal end of card-ejecting means 201. If NO, the operation goes to step S9, in which the destination of this card 100 is changed. If YES in step S8, case 3 is moved to card-ejecting means 201 to receive cover 130, in step S10. In the next step, S11, stopper mechanism 216A releases cover 130, thus inserting cover 130 into case 3. Then, in step S12 it is determined whether or not case 3 contains a cover 130 containing card 100 of the same destination. If YES, it is determined in step S13 whether or not three covers 130 have been inserted into case 3.

If NO in step S13, the operation goes to step S14, in which the next cover 130 is inserted from the same card-ejecting means into case 3, and steps S12 and S13 are repeated until the number of covers 130 inserted in case 3 increases to 3. If YES in step S13, the operation ends (step S15). Case 3 containing three covers 130 is transported from case transport apparatus 66 to the desired station.

If NO in step S12, it is determined in step S16 whether or not any other card-ejecting means exist in U-turn path 203, next to means 201 at which case 3 containing one or two covers 130 is located. If NO, case 3 containing one or two covers 130 is transported from apparatus 66 to the desired station, whereby the operation ends in step S17.

If YES in step S16, the operation goes to step S18. In this step S18, it is determined whether or not any cover 130 has reached the distal end of the next card-ejecting means 201. If YES, case 3 is moved to this means 201 to receive the cover 130 in step S19. When case 3 reaches card-ejecting means 201, stopper mechanism 216A releases cover 130, thus inserting this cover into case 3, in step S20. Then, in step S21 it is determined whether or not case 3 contains a cover 130 containing card 100 of the same destination. If YES, it is determined in step S22 whether or not three covers 130 have been inserted into case 3. If NO in step S22, the operation goes to step S24, in which the next cover 130 is inserted from the same card-ejecting means into case 3, whereby the operation ends in step S23. If YES in step S22, the operation also ends (step S23). Case 3 containing three covers 130 is transported from case transport apparatus 66 to the desired station.

If NO in step S21, it is determined in step S25 whether or not any other card-ejecting means exists in U-turn path 203, next to means 201 at which case 3 containing one or two covers 130 is located. If NO, case 3 containing one or two covers 130 is transported from apparatus 66 to the desired station, whereby the operation ends in step S30. If YES in step S25, the operation goes to step S26. In this step S26, it is determined whether or not any cover 130 has reached the distal end of the next card-ejecting means 201. If NO, case 3 containing one or two covers 130 is transported from apparatus 66 to the desired station, whereby the operation ends in step S30. If YES, it is determined in step S27 whether or not three covers 130 have been inserted into case 3. If NO in step S27, case 3 is moved to card-ejecting means 201 to receive cover 130. When case 3 reaches card-ejecting means 201, stopper mechanism 216A releases cover 130, thus inserting this cover into case 3, in step S29. Now that three covers 130 have been inserted into case 3, no more case 3 can be inserted (S30).

With reference to FIGS. 20A, 20B, 20C and 20D, it will be described, in still greater detail, how covers 130 each containing a medical card 100 are supplied from automatic card storages 65A, 65B and 65C into case 3 by means of card-ejecting means 201.

As has been described, in accordance with the card-fetching instructions, robot 121 removes covers 130 containing the desired cards, which are to be transported to the same destination, from cabinets 120 of the automatic card storage 65A, 65B, or 65C. Robot 121 then carries covers 130 to chute 125 (FIG. 18) and releases these covers onto chute 125. Covers 130 are then transferred onto conveyor belt 215 of card-ejecting means 201, one after another, as is illustrated in FIG. 18.

Stopper mechanism 216A, 216B and 216C—all arranged along the conveyor belt 215—are controlled by minicomputer 108 such that three covers 130 are inserted into one case 3. For the simplicity of explanation, those covers 130 to be transported to a first destination are designated by the same letter, A, B, C, D, E, F or G. Cases 3 for containing covers A, covers B, covers C, and so on are denoted by 3A, 3B, 3C, 3D, 3E, 3F and 3G, respectively.

First, minicomputer 108 supplies card-fetching signals to automatic card storages 65A, 65B and 65C in accordance with the patient ID numbers, the doctor ID codes and the serial numbers of the visiting patients—all supplied from reception terminal 110. Robot 121 installed in each card storage withdraws, form cabinets 120, covers 130 of the same destinations, three at a time, in the order defined by the serial numbers of the visiting patients. Further, also in accordance with the card-fetching signals supplied from minicomputer 108, each robot 121 withdraws first covers A, then covers B, next covers C, ... , finally covers G. Cases 3A to 3G are transported in the forward path 203A of U-turn path 203, in such a manner that first covers A are inserted into cases 3A, three by three, then covers B into cases 3B, three by three, next covers C into cases 3C, also three by three, and so forth.

More specifically, empty case 3A is moved in forward path 203A to the position indicated by two-dot, one-dash lines in FIG. 20A, to receive three covers A. In other words, case 3A is transported to the distal end of the card-ejecting means 201 connected to first card storage 65A. Three covers A are inserted into case 3A. Since these three covers A have been continuously withdrawn from cabinet 120 by means of robot 121, they are sequentially inserted into case 3A. Case 3A, now containing three covers A, is transported in the direction of arrow X, not being stopped at the outlet of the second card storages 65B or the outlet of the third card storage 65C.

Then, as is shown in FIG. 20B, case 3B, which follows case 3A, is stopped at card-ejecting means 201 connected to second card storage 65B, and case 3C, which follows case 3B, is stopped at card-ejecting means 201 connected to first card storage 65A. At this time, one cover B is located at the outlet of card storage 65B, and two covers C are located at the outlet of card storage 65A, and two covers B are located at the outlet of card storages 65C. Hence, the first cover B is inserted into case 3B, and the first and second covers C are inserted into case 3C. As is shown in FIG. 20C, case 3B containing the first cover B is moved to the outlet to automatic card storage 65C while the second cover C is being inserted into case 3C. At the outlet of card storage 65C, the second and third cover B are inserted into case 3B. Case 3B, now containing three covers B, is transported in the direction of arrow X. Thereafter, as is illustrated in FIG. 20D, case 3C containing the first and second cover C is transported to the outlet of automatic card storage 65B, to which the third cover C has been supplied. Hence, the third cover C is inserted into case 3C. At the same time, case 3D, which follows case 3C, is stopped at the outlet of first card storage 65A, to which the first cover D has been supplied. Thus, the first cover D is inserted into case 3D.

Other covers D, E, F and G are inserted into cases 3D, 3E, 3F and 3G in the same way as has been described above, in groups each containing of three covers of the same destination.

Three covers of the same destination need not always be inserted into the case. For example, if only one or two patients visit the hospital to see the same doctor, one cover containing the card of the sole patient, or two covers containing the cards of the two patients must be inserted into case 3. With reference to FIGS. 21A to 21C, it will be described how one or two covers 130 of the same destination are inserted into case 3. In FIGS. 21A to 21D, the same reference symbols are used to denote covers 130 and cases 3.

First, as is shown in FIG. 21A, case 3A is moved in forward path 203A in the direction of arrow X until it reaches the position indicated by two-dot, one-dash lines, which is located at the outlet of automatic card storage 65A. Two covers A, which have been supplied to the outlet of storage 65A, are inserted into case 3A, one after the other, by means of card-ejecting means 201 connected to first card storage 65A. Since no other covers A of the same destination have been supplied to the outlet of card storage 65A, or at the outlets of other card storages 65B and 65C, case 3A is moved in forward path 203A in the direction of arrow X, without stopped at the outlet of card storage 65B or 65C. Then, as is shown in FIG. 21B, case 3B, which follows case 3A, is transported to the outlet of second card storage 65B since two covers B have been supplied to the outlet of this card storage 65B. Accordingly, two covers B of the same destination are inserted into case 3B by means of card-ejecting means 201 coupled to the second card storage 65B. As is shown in FIG. 21C, case 3B containing two covers B is moved to the outlet of third card storage 65C, to which third cover B has been transferred. Hence, this third cover B is inserted into case 3B by means of card-ejecting means 201 coupled to third card storage 65C. Cases 3C and 3D, both following case 3B, pass by card storage 65A and 65B since neither cards A nor cards B have been supplied to card storage 65A to 65B. As is illustrated in FIG. 21D, case 3C, which follows case 3B, is stopped at the outlet of third card storage 65C, to which cover C has been transferred. This cover C is thus inserted into case 3C by means of card-ejecting means 201 connected to third card storage 65C. At the same time, cover E supplied to the outlet of first card storage 65A is inserted into case 3E staying at the outlet of first card storage 65A. Two covers D remain at the outlet of third card storage 65C until case 3D, which follows case 3C, reaches the outlet of card storage 65C. Case 3C, containing only one cover C, is transported in the direction of arrow X. Other covers D, E, F and G are inserted into cases 3D, 3E, 3F and 3G in the same way, in groups each consisting of one or two covers of the same destination.

Cases 3 (3A to 3G), into which covers 130 (A to G) have been inserted in either the method shown in FIGS. 20A to 20D or the method shown in FIGS. 21A to 21D, are transported to vertical transport section 200 in return path 203B of U-turn path 203 f case transport apparatus 66 (FIG. 9). Cases 3 are further transported to position Pg of case-collecting section 55 through downward path 200B, one after another. Then, each case 3 is transferred from position Pg to position Ph as is shown in FIGS. 10 and 11. At position Ph, detector 75 (FIGS. 10 and 12) determines whether or not any cover 130 is projecting from case 3. If no covers 130 are projecting from case 3, case 3 is transported to position Pi. If any cover 130 is projecting, the lamp and chime of console panel 56 are operated, thus informing the operator that at least one cover 130 is projecting from case 3. The operator pushes this cover 130 back into case 3. Then, case 3 is further transported to position Pi. At position Pi, cover 5 of case 3 is closed. The closed case is moved to position Pj and then transferred onto stage 42 by means of downward vertical belt 68. Case 3 is mounted on carrier 14 travelling in main transport path 1, and is thereby transported to station 12, e.g., the internist's office 12A.

Any medical card other than those withdrawn from automatic card storage 65A, 65B and 65C can be dispatched from station 12B to any desired office. More specifically, the operator inserts cover 130 containing such medical card into the empty case 3 located at position Pf. Then, he or she pushes interrupt button 83 on console panel 56 (FIG. 13), thus switching the operation mode to an interrupt mode. The operator operates numeral-key pad 80, thereby designating the destination of this cover 130, and further pushes dispatch button 81. Case 3 containing the cover is then automatically transported to the desired office. When it is necessary to transport several covers 130 other than those withdrawn from card storages 65A, 65B and 65C, continuously one after another, the operator pushes mode-switching button 84. As a result, station 12B can operate independently of automatic card storage 65A, 65B and 65C, and can thus be operate very efficiently.

In the transport system, the destination of each case 3 and the condition in which case 3 is being transported are monitored In accordance with the destination and condition, the transport of case 3 is controlled.

Should case transport apparatus 66 or any card-ejection means 201 fails to perform its function due to some cause, the operator may pushes mode-switching button 84, and then insert covers 130 withdrawn from automatic card storages 65A, 65B and 65C into the empty cases 3 located at position Pf. In this case, too, covers 130 containing cards 100 are automatically transported from station 12B to any desired station.

Covers 130 containing cards 100, which have been used in any doctor's office, are inserted back into cases 3. Then, cases 3 are inserted into case transfer section 40 (FIG. 8) of section 12 installed in the doctor's office. Each case 3 is sent back automatically to station 12B via transport means 150 consisting of main transport path 1 and branch path 2. When case 3 reaches station 12B, the lamp and chime of console panel 56 are turned on, thus informing the operator of the arrival of case 3. Cover 5 of case 3 is automatically opened as is shown in FIG. 11. If case 3 is empty, it is sterilized by ultraviolet-ray sterilizer 54. The sterilized case is transported to case-collecting section 55 and stored there temporarily. Case transport apparatus 66 transports the empty, sterilized cases 3 to automatic card storages 65A, 65B and 65C. In card storages 65A, 65B and 65C, covers 130 containing cards 100 are inserted into sterilized case 3.

When cases 3 containing covers 130 are sent from various stations 12 back to station 12B, the operator pulls covers 130 from these cases 3 and inserts them into lack wagons 127 (FIG. 9), at random. Lack wagons 127 are pushed into the wagon-receptacles provided in card storages 65A, 65B and 65C. Robots 121 provided in these card storages pull covers 130 from lack wagons 127 and file covers 130 at random into cabinet 120. As covers 130 are thus filed into cabinets 120, a bar-code reader (not shown) reads the bar-code printed or labeled on each over 130. The data representing the bar-code (i.e., the ID number of the cover) and the data representing the position where the cover is filed in cabinet 120 are stored into minicomputer 108. Thus, robot 121 can withdraw each cover 130, whenever necessary, in accordance with these data items stored in minicomputer 108.

Since covers 130 are automatically withdrawn from card storages 65A, 65B and 65C and automatically transported to the doctor's offices, the transport system according to the present invention can save labor and reduce the time required to transport medical cards 100 to their destinations.

Since the transport system has three automatic card storages 65A, 65B and 65C, each provided with a robot, more covers 130 can be withdrawn from cabinets 120 within a specific period of time, than in the case where the system has less automatic card storages. Moreover, covers 130 which are to be transported to the same doctor's office are automatically inserted into the same case 3 after they have been withdrawn from cabinets 120 by robots 121. Much labor can be saved which would otherwise be required to classify or sort covers 130, thus enhancing the efficiency of transporting these covers to their respective destinations. In addition, since each case 3 cannot be detached from transfer section 40, main transport path 1, or branch path 2, no persons, but the person working at station 12B, can discard case 3 by mistake.

Furthermore, since cover 130 containing any desired card 100 can be transported, interrupting the transport of other covers 130, by first pushing interrupt button 83, then operating numeral-key pad 80, and finally pushing dispatch button 81. Thus also helps to enhance the efficiency of transporting medical cards 100. Furthermore, in case transport apparatus 66 or any card-ejecting means 201 fails to operate, station 12B can be operated independently of automatic card storages 65A, 65B and 65C, merely by pushing mode-switching button 84. Thus, an entire system failure is prevented. Still further, since station 12B has detector 75 which detects that case 5 is opened, thus determine that case 3 is open. When detector 75 detects this, the lamp and chime of console panel 56 of station 12B are turned on, thereby informing the operator of this fact. The operator an, therefore, close case 5, thereby to prevent troubles that may result if case 3 is left open. Moreover, since not only covers 130 containing cards 100, but also other sheet-like objects can be manually placed on case-controlling section 55 and removed therefrom, these objects, as well as covers 130, can be transported from section 12B to any desired office through transport means 150.

Furthermore, since forward path 203A of U-turn path 203 is inclined, covers 130 each containing a card 100 are smoothly inserted into case 3 on path 203A by means of card-ejecting means 201. In addition, since U-turn path 203 is provided in the ceiling of the card storage room, rendering the card storage room more spacious than when path 203 is set on the ceiling.

Still further, since each case 3 is temporarily stopped in forward path 203A of U-turn path 203 to receive covers 130 ejected by card-ejecting means 201, the insertion of covers 130 into case 3 is ensured. Since at most three covers 130 are inserted into each case 3 though case 3 can hold five covers, the change is small that a cover being inserted into case 3 collides with the cover already inserted in case 3. Therefore, the transport system is reliable.

The transport system described above has three automatic card storages 65A, 65B and 65C. Nonetheless, the present invention can apply to a system having one, two or four or more automatic card storages. Further, the flexible sliding cover of each case 3 can be replaced with a cover of a different structure.

The transport system described above is used to transport covers 130 each containing a medical card 100. Nonetheless, the system can be utilized to withdraw articles of another type from a store, and transport them to desired places.

In the transport system according to the present invention, articles withdrawn from the automatic card storages are transported to their respective destinations via the second station and the transport means. No human labor is required to sort the articles in accordance with their destinations or to transport them to the destinations. The transport system saves labor and time in transporting articles.

What is claimed is:

1. A system for transporting articles to stations having different addresses, respectively, comprising:
   storage means for storing a plurality of articles, each article containing specific identification and address information;
   selecting means for selecting address information and for retrieving said articles having the selected address information from said storage means;
   carrying means for carrying a group of articles having the same selected address to a station having an address designated by the selected address information, the number of articles included in said group being not more than a predetermined number;
   conveying means for conveying the articles retrieved from the selecting means and depositing the articles in the carrying means; and
   transport means for transporting said articles carried in said carrying means from said storage means to said stations and for transporting said articles carried in said carrying means from one station to another.

2. A system according to claim 1, wherein said storage means includes a plurality of racks in which the articles are arranged.

3. The system according to claim 1 wherein said carrying means includes a plurality of cases within which said predetermined number of articles are carried.

4. The system according to claim 1 wherein said transport means comprises a main transport path extending between a plurality of secondary transport paths, said secondary transport paths extending from said main transport path to each of said stations.

5. The system according to claim 1 wherein said transport means comprises relay means for stopping said articles temporarily and moving said articles towards said stations and storage means.

6. The system according to claim 1 further comprising signal-generating means for generating location-designating signals designating the location of said articles, and destination-designating signals designating a destination of said articles.

7. The system according to claim 6 further comprising control means for supplying said transport means with said location-designating signals and said destination-designating signals, and for controlling the transportation of said articles.

8. The system according to claim 1 wherein said articles are medical information cards.

9. A system for transporting articles to stations having different addresses, respectively, comprising:
   storage means for storing a plurality of articles, each article having particular identification and address information;
   means for retrieving a group of articles with the same particular identification or address information from said storage means;
   transport means for transporting said articles from said storage means to said stations and for transporting said articles from one station to another;
   assessing means for sequentially assessing the identification and address information of the articles to generate access signals, said access signals identifying and designating the location of said articles and the destination of said articles;
   selecting means for selecting address information and for retrieving said articles having the selected address information from said storage means;
   carrying means for carrying said group of articles having the same selected address to a station having an address designated by the address information, the number of articles included in said group being not more than a predetermined number; and
   conveying means for conveying the articles retrieved from the selecting means and depositing the articles in the carrying means.

10. A system according to claim 9, wherein said storage means includes a plurality of racks in which the articles are arranged.

11. The system according to claim 9 wherein said transport means comprises a main transport path extending between a plurality of secondary transport paths, said secondary transport paths extending from said main transport path to each of said stations.

12. A system for transporting articles to stations having different addresses, respectively, comprising:
   storage means for storing a plurality of articles, each article containing specific identification and address information, the storage means including a plurality of cabinets for holding the articles;
   selecting means for selecting address information and for retrieving the articles having the selected address information from the storage means, the selecting means comprising robotic means for retrieving the articles from the cabinets;
   carrying means for carrying a group of articles having the same selected address to a station having an address designated by the selected address information, the number of articles included in the group being not more than a predetermined number;
   conveying means for conveying the articles retrieved by the robotic means and depositing the articles in the carrying means; and
   transport means for transporting the articles carried in the carrying means from the storage means to the stations and for transporting the articles carried in the carrying means from one station to another.

13. The system of claim 12 wherein the plurality of cabinets extend parallel to each other and define passages therebetween.

14. The system of claim 13 wherein the robotic means comprise a plurality of robots, one disposed in each of the passages between the cabinets.

15. The system of claim 14 wherein each of the robots include a body portion for moving along the length of the cabinets and a head portion for moving vertically along the height of the cabinets.

16. The system of claim 15 wherein the head portion of each of the robots includes a pair of arms for grasping and retrieving the articles one at a time.

17. The system of claim 13, wherein the conveying means includes a plurality of card ejecting devices disposed at an entrance of each of the passages for receiving the articles retrieved by the robotic means.

18. The system of claim 12, wherein the address information represents the location and position of the article in the cabinets.

19. A system for transporting articles to stations having different addresses, respectively, comprising:
  storage means for storing a plurality of articles, each article containing specific identification and address information, the storage means including a plurality of cabinets for holding the articles;
  selecting means for selecting address information and for retrieving the articles having the selected address information from the storage means, the selecting means comprising robotic means for retrieving the articles from the cabinets;
  carrying means for carrying a group of articles having the same selected address to a station having an address designated by the selected address information, the number of articles included in the group being not more than a predetermined number;
  conveying means for conveying the articles retrieved by the robotic means and depositing the articles in the carrying means, including a plurality of card ejecting devices in communication with the cabinets for receiving the articles retrieved by the robotic means; and
  transport means for transporting the articles carried in the carrying means from the storage means to the stations and for transporting the articles carried in the carrying means from one station to another.

* * * * *